US012172403B2

(12) United States Patent
Kondo

(10) Patent No.: US 12,172,403 B2
(45) Date of Patent: Dec. 24, 2024

(54) DIE CUSHION DEVICE

(71) Applicant: AIDA ENGINEERING, LTD., Kanagawa (JP)

(72) Inventor: Tadahiro Kondo, Kanagawa (JP)

(73) Assignee: AIDA ENGINEERING, LTD., Kanagawa (JP)

( * ) Notice: Subject to any disclaimer, the term of this patent is extended or adjusted under 35 U.S.C. 154(b) by 443 days.

(21) Appl. No.: 17/559,895

(22) Filed: Dec. 22, 2021

(65) Prior Publication Data

US 2022/0203643 A1 Jun. 30, 2022

(30) Foreign Application Priority Data

Dec. 25, 2020 (JP) ................................ 2020-216637

(51) Int. Cl.
*B30B 15/16* (2006.01)
*B21D 24/02* (2006.01)
*B30B 15/06* (2006.01)

(52) U.S. Cl.
CPC ............ *B30B 15/166* (2013.01); *B21D 24/02* (2013.01); *B30B 15/061* (2013.01); *B30B 15/163* (2013.01)

(58) Field of Classification Search
CPC ... B30B 15/166; B30B 15/061; B30B 15/163; B30B 15/16; B30B 1/32; B21D 24/02; B21D 55/00; B21C 51/00
See application file for complete search history.

(56) References Cited

U.S. PATENT DOCUMENTS

| | | | | |
|---|---|---|---|---|
| 9,782,816 | B2 * | 10/2017 | Kohno | B21D 24/02 |
| 10,603,709 | B2 | 3/2020 | Kohno et al. | |
| 2009/0071218 | A1 | 3/2009 | Kohno et al. | |
| 2011/0226141 | A1 | 9/2011 | Kohno | |
| 2014/0202223 | A1 | 7/2014 | Kohno et al. | |
| 2015/0360274 | A1 | 12/2015 | Kohno et al. | |
| 2016/0271675 | A1 | 9/2016 | Choi | |

(Continued)

FOREIGN PATENT DOCUMENTS

| | | | | |
|---|---|---|---|---|
| EP | 3115119 A1 * | 1/2017 | | B21D 24/02 |
| JP | S61-205619 U | 12/1986 | | |

(Continued)

OTHER PUBLICATIONS

English translation of JP 2017018988A, Kono Yasuyuki, retrieved in May 2024, 21 pages.*

(Continued)

*Primary Examiner* — Jimmy T Nguyen
(74) *Attorney, Agent, or Firm* — Rimon P.C.

(57) ABSTRACT

The die cushion device includes a first hydraulic cylinder for supporting a cushion pad, and a first hydraulic circuit for driving the first hydraulic cylinder. The first hydraulic circuit is a hydraulic closed circuit including a logic valve connected between a die cushion pressure generation line and a system pressure line, and a hydraulic pump driven by a first servomotor for applying a pilot pressure to the logic valve. The first controller controls the first servomotor (pilot pressure) based on a first pressure command corresponding to the die cushion force and the pressure detected by the first pressure detector to control the pressure in a lower chamber of the first hydraulic cylinder so that the pressure is equal to a pressure corresponding to the first pressure command.

27 Claims, 12 Drawing Sheets

(56) References Cited

U.S. PATENT DOCUMENTS

| | | | |
|---|---|---|---|
| 2017/0008061 A1 | 1/2017 | Kohno | |
| 2017/0182539 A1 | 6/2017 | Makabe | |
| 2018/0243811 A1 | 8/2018 | Kohno | |

FOREIGN PATENT DOCUMENTS

| | | | |
|---|---|---|---|
| JP | H07-024600 | A | 1/1995 |
| JP | 2014-140871 | A | 8/2014 |
| JP | 2016-000407 | A | 1/2016 |
| JP | 2017-18988 | A | 1/2017 |
| JP | 2017-113786 | A | 6/2017 |
| WO | 2010/058710 | A1 | 5/2010 |

OTHER PUBLICATIONS

Extended European Search Report issued on May 27, 2022 for the corresponding European Patent Application No. 21217438.7.

Japanese Office Action dated Oct. 20, 2023 issued in the corresponding Japanese Patent Application No. 2020-216637, with English machine translation.

Official Communication Pursuant to Article 94(3) dated Nov. 8, 2023 issued in the corresponding European Patent Application No. 21217438.7.

Decision to Grant a Patent received in Japanese Patent Application No. 2020-216637, issued Dec. 28, 2023.

* cited by examiner

DIE CUSHION DEVICE

CROSS-REFERENCE TO RELATED APPLICATIONS

The present application claims priority under 35 U.S.C. § 119 to Japanese Patent Application No. 2020-216637 filed on Dec. 25, 2020. The above application is hereby expressly incorporated by reference, in its entirety, into the present application.

BACKGROUND OF THE INVENTION

Field of the Invention

The present invention relates to a die cushion device, and particularly relates to an inexpensive and functional die cushion device.

Description of the Related Art

Conventionally, inexpensive and functional die cushion devices have been proposed in Japanese Patent Application Laid-Open No. 2016-000407 (hereinafter referred to as "Patent Literature 1") and International Publication No. WO2010/058710 (hereinafter referred to as "Patent Literature 2").

In the die cushion device described in Patent Literature 1, a hydraulic closed circuit for generating die cushion pressure is connected to a lower chamber of a hydraulic cylinder which supports a cushion pad. The hydraulic closed circuit includes: a die cushion pressure generation line connected to the lower chamber of the hydraulic cylinder; a system pressure line connected to an accumulator in which hydraulic oil having a low-pressure system pressure capable of performing a knockout action is accumulated; a pilot-operated logic valve (pilot logic valve) which is arranged between the die cushion pressure generation line and the system pressure line and can operate as a main relief valve during a die cushioning action; and a pilot relief valve for generating pilot pressure. Further, the hydraulic oil is filled and sealed in a pressurized manner in advance in the hydraulic closed circuit.

According to the die cushion device described in Patent Literature 1, in one cycle period of the cushion pad including the die cushioning action and the knockout action, the hydraulic oil in the hydraulic closed circuit can be pressurized only by a die cushion force applied from the cushion pad via the hydraulic cylinder. Therefore, the die cushion device can be configured without any hydraulic drive source such as a hydraulic pump, and thus is simple and inexpensive.

Further, the die cushion device described in Patent Literature 2 has both a hydraulic servo type control function for performing throttle-control using a proportional valve, and an electric servo type control function using a hydraulic pump/motor driven by a servomotor. In the die cushion device, the opening degree of the proportional valve and the torque of the servomotor are controlled in such a manner that the die cushion pressure in a die cushion pressure generating chamber (lower chamber) of the hydraulic cylinder which supports the cushion pad becomes equal to a pressure corresponding to a die cushion pressure command.

According to the die cushion device described in Patent Literature 2, when the die cushion pressure acts, the hydraulic oil which is pushed away from the lower chamber of the hydraulic cylinder is discharged to a low-pressure source side via the proportional valve and the hydraulic pump/motor. Therefore, as compared with a case where the die cushion pressure is controlled by the servomotor (and hydraulic pump/motor) alone, the capacity of the servomotor can be reduced, and as a result, the device can be reduced in size and cost.

CITATION LIST

Patent Literature 1: Japanese Patent Application Laid-Open No. 2016-000407

Patent Literature 2: International Publication No. WO2010/058710

SUMMARY OF THE INVENTION

The die cushion device described in Patent Literature 1 is a simple and inexpensive device having no hydraulic drive source. However, because the pilot relief valve uses the pressure of the hydraulic oil in the lower chamber of the hydraulic cylinder to generate pilot pressure, there is a problem that the die cushion pressure increases slowly so that it takes long time for the die cushion pressure to reach a predetermined pressure.

Further, in the die cushion device described in Patent Literature 1, because pressure override occurs according to a flow rate characteristic particular to the pilot relief valve, the pressure fluctuates depending on the flow rate (the velocity of the die cushion cylinder). In a press machine, because the velocity of the die cushion cylinder is reduced especially near bottom dead center, the die cushion pressure drops accordingly. As a result, there is a problem that a predetermined pressure cannot be maintained up to the bottom dead center.

Further, in the die cushion device described in Patent Literature 2, over a period when press forming is performed, the hydraulic oil pushed away from the lower chamber of the hydraulic cylinder is discharged to the low-pressure source side via a hydraulic pump/motor which is subjected to torque control by the servomotor, and during a period when a large amount of hydraulic oil is pushed away from the lower chamber of the hydraulic cylinder (during an initial period of the press forming when the sliding speed of the press machine is high), the proportional valve is opened so that the hydraulic oil which cannot be covered by the hydraulic pump/motor alone is discharged to the low-pressure source side via the proportional valve. Thus, there is a problem that in a case where the control of the servomotor and the control of the proportional valve are performed in a compact hydraulic drive device, malfunction may occur due to noises of these controls. In addition, the control of the servomotor and the control of the proportional valve are complicated.

The present invention has been made in view of such circumstances, and aims to provide a die cushion device capable of excellently controlling a die cushion force at low cost.

In order to attain the above object, a die cushion device according to an aspect of the present invention comprises: a first hydraulic cylinder configured to support a cushion pad and cause the cushion pad to generate a die cushion force in a case where a slide of a press machine is moved downward; a first hydraulic circuit configured to drive the first hydraulic cylinder; a first pressure commander configured to output a first pressure command indicating a die cushion pressure corresponding to the die cushion force; a first pressure detector configured to detect a pressure in a lower chamber of the first hydraulic cylinder; and a first controller configured to control the first hydraulic circuit based on the first pressure command and the pressure detected by the first pressure detector in such a manner that a pressure applied to the lower chamber of the first hydraulic cylinder is equal to a pressure corresponding to the first pressure command, wherein the first hydraulic circuit is a hydraulic closed circuit including a die cushion pressure generation line connected to the lower chamber of the first hydraulic cylinder, a system pressure line to which a first accumulator configured to accumulate hydraulic fluid having a first system pressure is connected, a pilot-operated logic valve which has an A port connected to the die cushion pressure generation line and a B port connected to the system pressure line, and a pressure generator configured to generate a pilot pressure to act on a pilot port of the logic valve, and wherein the first controller controls the pilot pressure based on the first pressure command and the pressure detected by the first pressure detector, and controls a pressure of hydraulic fluid flowing from the A port of the logic valve to the B port of the logic valve in such a manner that a pressure of hydraulic fluid in the lower chamber of the first hydraulic cylinder which is a pressure on the A port side is equal to the pressure corresponding to the first pressure command.

According to the aspect of the present invention, when the die cushion pressure acts, the hydraulic fluid which is pushed away from the lower chamber of the first hydraulic cylinder is discharged to the low-pressure source side of the first system pressure (the first accumulator side) via the pilot-operated logic valve, thereby generating the die cushion pressure. In this case, because the pilot pressure which acts on the pilot port of the logic valve and generated by the pressure generator is controlled based on the first pressure command corresponding to the die cushion force and the pressure detected by the first pressure detector, the die cushion force may be excellently controlled.

In addition, even in a case where the flow rate of the hydraulic fluid pushed away from the lower chamber of the first hydraulic cylinder when the die cushion pressure acts is large, the flow rate may be covered by the logic valve. Therefore, the slide speed may be increased, and thus the first aspect may be applied to a die cushion device that generates a large die cushion force. Further, since the pressure generator is only required to be capable of generating a pilot pressure, the pressure generator may be made with reduced cost, and thus the die cushion device may be made with reduced cost.

A die cushion device according to another aspect of the present invention comprises: a first hydraulic cylinder configured to support a cushion pad and cause the cushion pad to generate a die cushion force in a case where a slide of a press machine is moved downward; a first hydraulic circuit configured to drive the first hydraulic cylinder; a second hydraulic cylinder configured to support the cushion pad and move the cushion pad in an up and down direction; a second hydraulic circuit configured to drive the second hydraulic cylinder; a die cushion position commander configured to output a die cushion position command indicating a position of the cushion pad; a die cushion position detector configured to detect a position of the cushion pad; and a second controller configured to control the second hydraulic circuit based on the die cushion position command output from the die cushion position commander and the position of the cushion pad detected by the die cushion position detector in such a manner that the position of the cushion pad matches a position corresponding to the die cushion position command, wherein the first hydraulic circuit is a hydraulic closed circuit including a die cushion pressure generation line connected to a lower chamber of the first hydraulic cylinder, a system pressure line to which a first accumulator for accumulating hydraulic fluid having a first system pressure is connected, a pilot-operated logic valve which has an A port connected to the die cushion pressure generation line and a B port connected to the system pressure line, and a pilot pressure applying unit configured to apply a pilot pressure to act on a pilot port of the logic valve.

According to the other aspect of the present invention, by providing the first hydraulic cylinder on which pressure control is performed and the second hydraulic cylinder on which position control is performed, the control of the die cushion force to be applied to the cushion pad and the control of the position of the cushion pad may be performed independently of each other. Even in a case where the first hydraulic circuit for driving the first hydraulic cylinder does not have a function of moving the cushion pad upward, the cushion pad may be moved to the position corresponding to the die cushion position command by the second hydraulic cylinder.

Further, when the die cushion pressure acts, the first hydraulic circuit for driving the first hydraulic cylinder discharges the hydraulic fluid pushed away from the lower chamber of the first hydraulic cylinder to the low-pressure source side via the pilot-operated logic valve, so as to generate the die cushion pressure. Therefore, the first hydraulic circuit may be made inexpensive. Further, since the second hydraulic circuit for driving the second hydraulic cylinder is merely required to be mainly capable of moving the cushion pad during a period other than press forming, the second hydraulic circuit may be made relatively inexpensive, so that the die cushion device may be configured at low cost as a whole.

DETAILED DESCRIPTION OF THE PREFERRED EMBODIMENTS

Preferred embodiments of a die cushion device according to the present invention will be described in detail hereunder with reference to the accompanying drawings.

[First Embodiment of Die Cushion Device]

Figure 1:
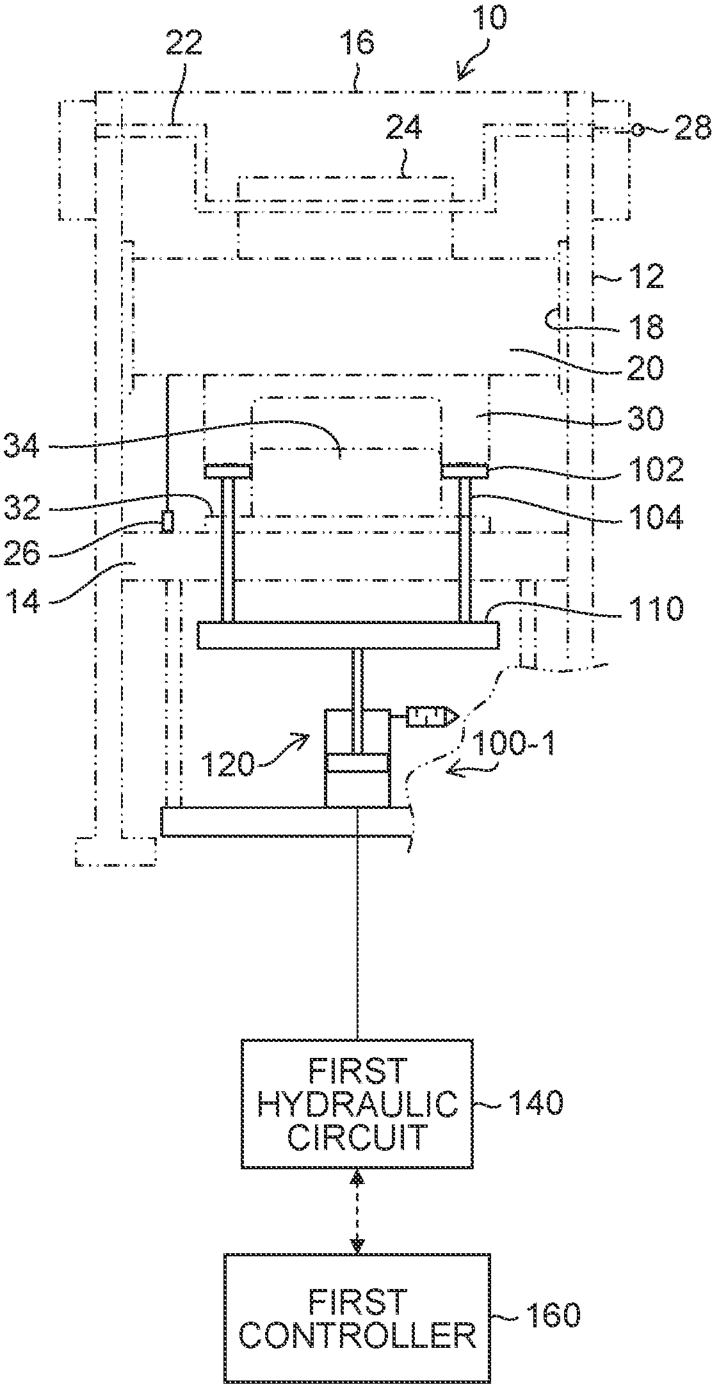
FIG. 1 is a configuration diagram showing a press machine including a die cushion device according to a first embodiment.

FIG. 1 is a configuration diagram showing a press machine including a die cushion device of a first embodiment.

In the press machine 10 shown in FIG. 1, a frame includes a column 12, a bed 14, and a crown (frame upper part strength member) 16, and a slide 20 is guided to freely move up and down (in a vertical direction) by a guide part 18 provided on the column 12.

A driving force is transmitted to the slide 20 from the servomotor via a crankshaft 22 and a connecting rod 24, and the slide 20 is moved up and down on the drawing surface of FIG. 1.

A slide position detector 26 configured to detect the position of the slide 20 is provided on the bed 14 side of the press machine 10, and the crankshaft 22 is provided with a crankshaft encoder 28 configured to detect each of the angle and angular velocity of the crankshaft 22.

An upper die 30 is attached to the slide 20, and a lower die 34 is attached to on a bolster 32 of the bed 14.

A blank holder (wrinkle press plate) 102 is arranged between the upper die 30 and the lower die 34, the lower side of the blank holder 102 is supported by a cushion pad 110 via a plurality of cushion pins 104, and a blank is set on (is in contact with) the upper side.

The press machine 10 performs press forming on the blank between the upper die 30 and the lower die 34 by moving the slide 20 downward. A die cushion device 100-1 presses the peripheral edge of the blank to be press-formed from below.

The die cushion device 100-1 according to the first embodiment includes: the blank holder 102; the cushion pad 110 for supporting the blank holder 102 via the plurality of cushion pins 104; a first hydraulic cylinder (first hydraulic cylinder) 120 configured to support the cushion pad 110 and cause the cushion pad 110 to generate a die cushion force; a first hydraulic circuit (first hydraulic circuit) 140 configured to drive the first hydraulic cylinder 120; and a first controller 160 configured to control the first hydraulic circuit 140.

The first hydraulic cylinder 120 functions as a hydraulic cylinder for causing the cushion pad 110 to generate the die cushion force through pressure control by the first hydraulic circuit 140 and the first controller 160.

<First Mode of First Hydraulic Circuit>

Figure 2:
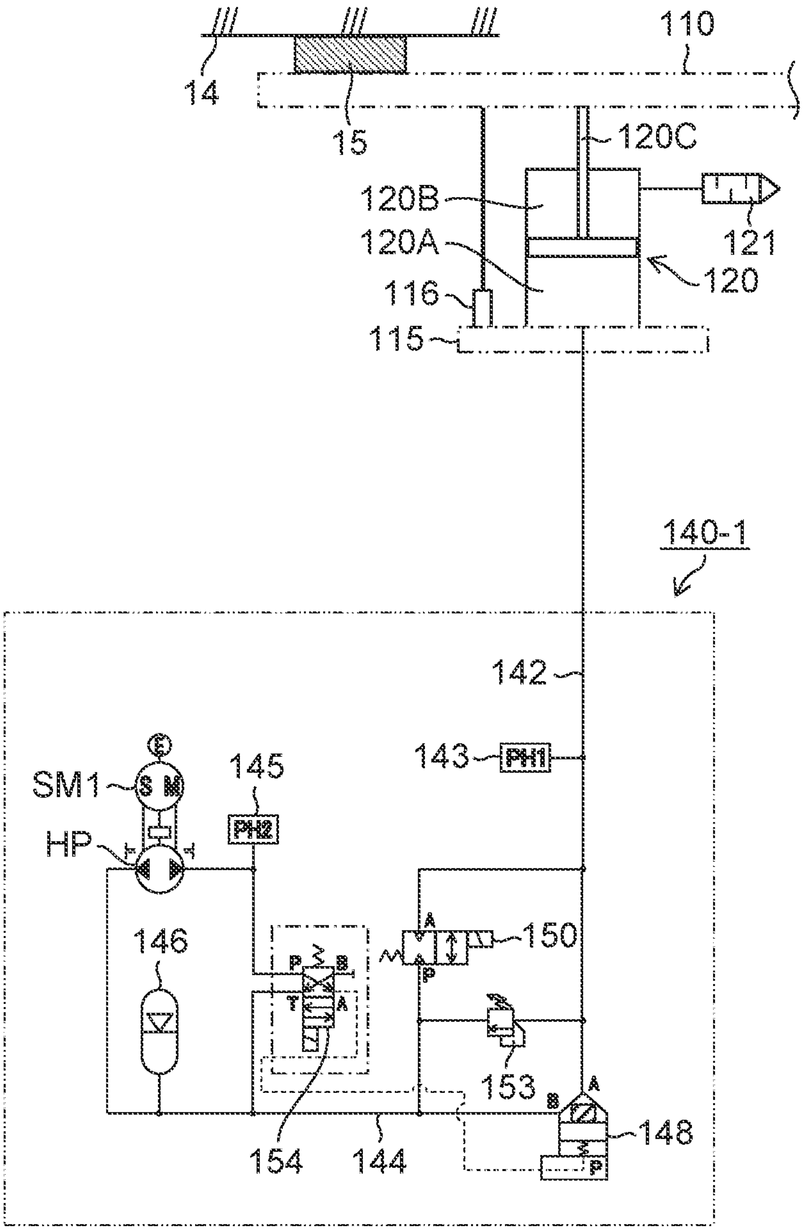
FIG. 2 is a diagram showing a first mode of a first hydraulic circuit for driving a first hydraulic cylinder of the die cushion device shown in FIG. 1.

FIG. 2 is a diagram showing a first mode of the first hydraulic circuit configured to drive the first hydraulic cylinder of the die cushion device shown in FIG. 1.

A piston rod 120C of the first hydraulic cylinder 120 shown in FIG. 2 is coupled to the lower surface of the cushion pad 110. A cushion pressure generation-side pressurizing chamber (hereinafter referred to as "lower chamber") 120A of the first hydraulic cylinder 120 is connected to a die cushion pressure generation line 142 of the first hydraulic circuit 140-1, and a rod-side pressure chamber (hereinafter referred to as an "upper chamber") 120B of the first hydraulic cylinder 120 is open to the atmosphere via a silencer 121.

In FIG. 2, an upper limit stopper 15 with which the cushion pad 110 may come into contact is provided on the lower surface of the bed 14. As shown in FIG. 2, the cushion pad 110 comes into contact with the upper limit stopper 15 in such a manner that the position of the cushion pad 110 in the vertical direction. The position where the position (the die cushion position) of the cushion pad 110 is restricted in the up-and-down direction is a die cushion standby position at which the cushion pad 110 stands by before press forming.

Further, a die cushion position detector 116 configured to detect the position of the cushion pad 110 is provided between the cushion pad 110 and a fixing part 115 to which the first hydraulic cylinder 120 is fixed. Note that the die cushion position detector may be incorporated in the first hydraulic cylinder 120 to detect the position in an expansion/contraction direction of the piston rod 120C as the die cushion position or may be provided between the bed 14 and the cushion pad 110.

The first hydraulic circuit 140-1 drives the first hydraulic cylinder 120 in such a manner that the cushion pad 110 generates the die cushion force. The first hydraulic circuit 140-1 has a hydraulic closed circuit including: the die cushion pressure generation line 142 connected to the lower chamber 120A of the first hydraulic cylinder 120; the system pressure line 144 to which a first accumulator 146 configured to accumulate hydraulic oil (hydraulic fluid) having a first system pressure is connected; a pilot-operated logic valve 148 having an A port connected to the die cushion pressure generation line 142 and a B port connected to the system pressure line 144; a first solenoid valve 150 configured to open and close a flow path between the die cushion pressure generation line 142 and the system pressure line 144; and a first servomotor (SM1) and a hydraulic pump (HP) which function as a pressure generator for generating a pilot pressure which acts on a pilot port P of the logic valve 148.

Hydraulic oil is supplied from an oil supply device to the first hydraulic circuit 140-1 via a coupler with a check valve (not shown) to fill the hydraulic oil having the first system pressure previously determined in a pressurized manner in the first hydraulic circuit 140-1.

The hydraulic oil having the first system pressure is accumulated in the first accumulator 146 connected to the system pressure line 144. A predetermined gas pressure is set in the first accumulator 146. The first accumulator 146 serves as a tank and also functions as a low-pressure source. Note that the first system pressure which is a low pressure, is required to be equal to or more than a pressure which may move the cushion pad 110 upward to perform the knockout action of a product and move the cushion pad 110 to the die cushion standby position.

In a case where the hydraulic oil having the first system pressure is filled and sealed in the first hydraulic circuit 140, the oil supply device is removed from the coupler, and then the first hydraulic circuit 140-1 serves as a hydraulic closed circuit, which prevents inflow and outflow of hydraulic oil thereinto and therefrom. Note that it is unnecessary to inject hydraulic oil from the oil supply device into the first hydraulic circuit 140-1 unless the first system pressure drops below a preset lower limit value.

Further, the first hydraulic circuit 140-1 is provided with: a first pressure detector 143 configured to detect the pressure in the lower chamber 120A of the first hydraulic cylinder 120 (die cushion pressure generation line 142); a pressure detector 145 configured to detect the pressure (pilot pressure) of hydraulic oil generated by the hydraulic pump (HP); a relief valve 153 arranged between the die cushion pressure generation line 142 and the system pressure line 144; and a second solenoid valve 154 configured to cause the first system pressure or the pilot pressure to selectively act on the pilot port P of the logic valve 148. Note that the relief valve 153 is provided as a device which operates when an abnormal pressure occurs in the lower chamber 120A of the first hydraulic cylinder 120 (when pressure control is impossible and a sudden abnormal pressure occurs), so as to prevent damage on hydraulic equipment.

The first hydraulic circuit 140-1 is configured to be capable of generating a die cushion pressure corresponding to the pilot pressure during the die cushion process by controlling the pilot pressure to be applied to the pilot port P of the logic valve 148.

<First Mode of First Controller>

Figure 3:
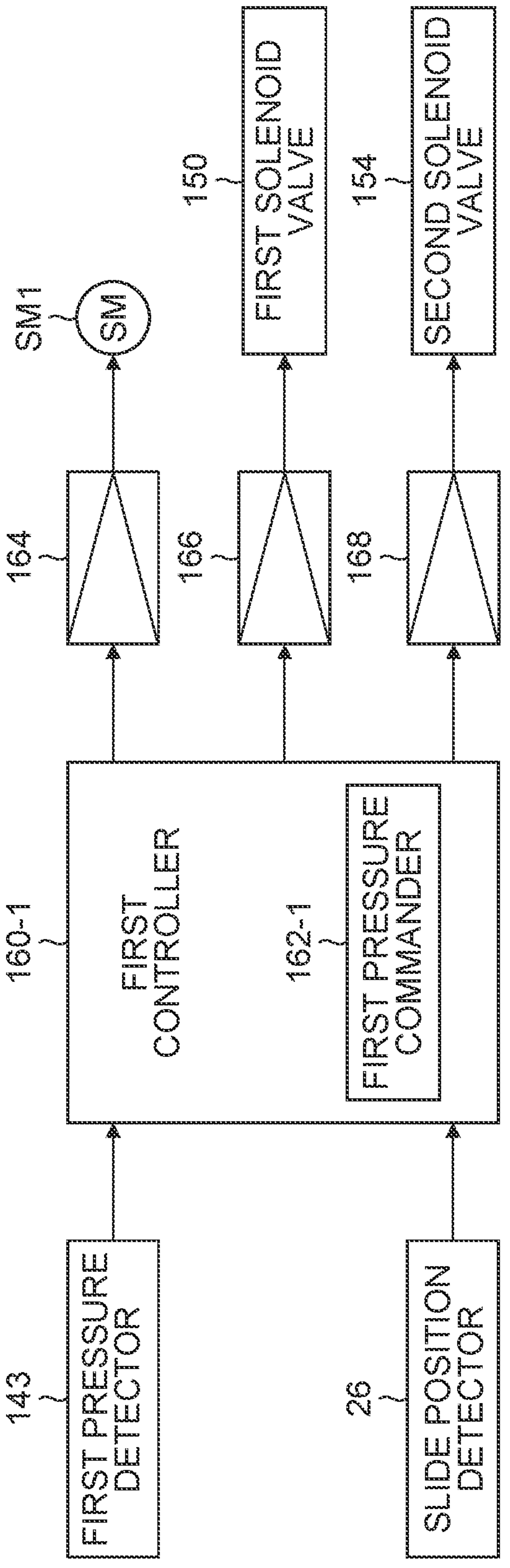
FIG. 3 is a block diagram showing a first mode of a first controller for controlling the first hydraulic circuit.

FIG. 3 is a block diagram showing a first mode of the first controller which controls the first hydraulic circuit, and particularly, FIG. 3 shows the first mode of the first controller 160-1 which controls the first hydraulic circuit 140-1 shown in FIG. 2.

As shown in FIG. 3, the first controller 160-1 receives: a pressure signal indicating the pressure in the lower chamber 120A of the first hydraulic cylinder 120 from the first pressure detector 143; and a slide position signal indicating the position of the slide 20 from the slide position detector 26.

The first controller 160-1 includes a first pressure commander 162-1. The first pressure commander 162-1 receives the slide position signal detected by the slide position detector 26 in order to output a die cushion pressure command (first pressure command) corresponding to the position of the slide 20.

The first pressure commander 162-1 outputs a first pressure command indicating the die cushion pressure corresponding to the die cushion force in order to control the die cushion force during press forming, and controls the output timing of the first pressure command, etc. based on the slide position signal.

Here, since the die cushion force to be applied from the first hydraulic cylinder 120 to the cushion pad 110 may be expressed by the product of the pressure in the lower chamber 120A of the first hydraulic cylinder 120 and the cross-sectional area of the cylinder, the controlling of the die cushion force means the controlling of the pressure in the lower chamber 120A of the first hydraulic cylinder 120.

Based on the first pressure command output from the first pressure commander 162-1 and the pressure signal indicating the pressure in the lower chamber 120A of the first hydraulic cylinder 120 which is detected by the first pressure detector 143, the first controller 160-1 calculates a torque command for driving the first servomotor (SM1) so as to control the pressure in the lower chamber 120A of the first hydraulic cylinder 120 according to the first pressure command.

The first controller 160-1 outputs the torque command calculated by using the first pressure command, the pressure signal, etc. to the first servomotor (SM1) via an amplifier 164, and drives the hydraulic pump (HP) via the first servomotor (SM1), thereby controlling the pressure of the hydraulic oil (pilot pressure) to be generated by the hydraulic pump (HP).

Further, in a case where the first controller 160-1 performs pressure control on the first hydraulic cylinder 120 in the die cushion process, the first controller 160-1 sets each of the first solenoid valve 150 and the second solenoid valve 154 of the first hydraulic circuit 140-1 to an OFF state (switching position shown in FIG. 2). Since the first solenoid valve 150 is closed in the OFF state, the flow path between the die cushion pressure generation line 142 and the system pressure line 144 is closed. Further, the second solenoid valve 154 is a 4-port 2-position solenoid valve, and the second solenoid valve 154 in the OFF state selects the pilot pressure out of two input pressures (the pilot pressure and the first system pressure), and applies the selected pilot pressure to the pilot port P of the logic valve 148.

The logic valve 148 in which the pilot pressure is applied to the pilot port P is in a closed state unless a pressure exceeding the pilot pressure is applied to an A port side of the logic valve 148 via the die cushion pressure generation line 142, so that the lower chamber 120A of the first hydraulic cylinder 120 may be pressurized.

Here, in a case where the slide 20 of the press machine 10 moves downward and the slide position has reached an impact position (die cushion standby position), the cushion pad 110 is subsequently moved downward along with the downward movement of the slide 20 (by a downward pressing force from the slide 20).

As the cushion pad 110 moves downward, the piston rod 120C of the first hydraulic cylinder 120 moves downward, and the hydraulic oil in the lower chamber 120A of the first hydraulic cylinder 120 is compressed so that the pressure in the lower chamber 120A increases.

A die cushion pressure proportional to the die cushion force is generated in the lower chamber 120A of the first hydraulic cylinder 120. To a poppet of the logic valve 148, are applied a poppet-opening force based on the die cushion pressure acting on the die cushion pressure generation line 142 from the A port and the first system pressure acting on the system pressure line 144 from the B port, a poppet-closing force based on the pilot pressure from the pilot port P and a spring force inside the logic valve, and a fluid force (hydrodynamic force) acting in a direction in which the flow of pressure oil from the die cushion pressure generation line 142 to the system pressure line 144 is disturbed (that is, in a direction the poppet is closed).

Here, conditions for controlling the die cushion pressure by the pilot pressure are: (1) the die cushion pressure is slightly larger than the pilot pressure; and (2) the pilot pressure is extremely larger than the first system pressure (that is, the difference between the pilot pressure and the first system pressure is larger than the difference between the die cushion pressure and the pilot pressure).

In the die cushion process, the poppet position (opening degree) of the logic valve 148 is adjusted in order to maintain the balance of these forces, and the die cushion pressure is generated in this series of actions. The first controller 160-1 controls the pilot pressure to be generated by the hydraulic pump (HP) based on the first pressure command indicating a desired die cushion pressure, so as to generate the die cushion pressure as instructed by the first pressure command.

When the slide position has reached the bottom dead center, the first controller 160-1 outputs a drive signal for setting the second solenoid valve 154 to an ON state to the second solenoid valve 154 via the amplifier 168 in order to terminate the control state of the die cushion pressure.

As a result, the first system pressure is applied to the pilot port P of the logic valve 148 via the second solenoid valve 154, so that the poppet of the logic valve 148 moves in an opening direction and the die cushion pressure is depressurized. At the time point when the depressurization of the lower chamber 120A of the first hydraulic cylinder 120 is completed, the poppet of the logic valve 148 is closed. Here, when the slide position has reached the bottom dead center, it is preferable to stop the first servomotor (SM1) because it is not necessary to apply the pilot pressure to the pilot port P of the logic valve 148.

When the slide 20 moves upward from the bottom dead center after the lower chamber 120A of the first hydraulic cylinder 120 is depressurized, the force pressing the cushion pad 110 downward is not applied from the slide 20 anymore. The pressure of the hydraulic oil (depressurized hydraulic oil) of the lower chamber 120A of the first hydraulic cylinder 120 is released, so that the cushion pad 110 moves upward slightly. However, after that, the cushion pad 110 may be stopped (locked) in the vicinity of the bottom dead center because the die cushion pressure generation line 142 and the system pressure line 144 are disconnected from each other by the logic valve 148 and the first solenoid valve 150.

After the cushion pad 110 has been locked for a certain period of time, the first controller 160-1 outputs a drive signal for setting the first solenoid valve 150 to an ON state to the first solenoid valve 150 via the amplifier 166.

The first solenoid valve 150 is set to the ON state when the first solenoid valve 150 receives the drive signal, and the valve position of the first solenoid valve 150 is switched from the state shown in FIG. 2 so as to open the valve. As a result, the flow path between the die cushion pressure generation line 142 and the system pressure line 144 is opened, and the hydraulic oil having the first system pressure accumulated in the first accumulator 146 may be supplied to the lower chamber 120A of the first hydraulic cylinder 120 via the system pressure line 144, the first solenoid valve 150 and the die cushion pressure generation line 142.

Since the first system pressure is a pressure which may move the cushion pad 110 upward to perform the knockout action of the product and move the cushion pad to the die cushion standby position, when the hydraulic oil having the first system pressure flows into the lower chamber 120A of the first hydraulic cylinder 120, the piston rod 120C (cushion pad 110) of the first hydraulic cylinder 120 is moved upward.

The cushion pad 110 moves upward until the cushion pad 110 comes into contact with the upper limit stopper 15, and then stops (stands by) at this point.

According to the die cushion device including the first hydraulic circuit 140-1 and the first controller 160-1, when the die cushion pressure acts, the hydraulic oil pushed away from the lower chamber 120A of the first hydraulic cylinder 120 is discharged to the low-pressure source side of the first system pressure via the pilot-operated logic valve 148 so as to generate the die cushion pressure. Particularly, because servo-control is performed on the first servomotor (SM1) and the hydraulic pump (HP) based on the first pressure command and the pressure in the lower chamber 120A of the first hydraulic cylinder 120 to generate the pilot pressure acting on the pilot port P of the logic valve 148, the die cushion pressure (die cushion force) may be excellently controlled.

That is, the die cushion device including the first hydraulic circuit 140-1 and the first controller 160-1 has higher responsiveness in the control of the pilot pressure as compared with the die cushion device described in Patent Literature 1 in which the pilot pressure is generated by the pilot relief valve, and may shorten the time to be taken until the die cushion pressure reaches a predetermined pressure (may increase the ascending speed of the die cushion pressure).

Further, in the hybrid servo die cushion device described in Patent Literature 2 which performs servo-control on each of the proportional valve and the hydraulic pump/motor, because the hydraulic pump/motor serving as a pressure generator directly receives a large flow rate of the die cushion cylinder, it suffers large disturbance. On the other hand, the first hydraulic circuit 140-1 suffers less disturbance because the hydraulic pump (HP) functioning as a pressure generator is provided in the pilot pressure line having no (few) flow rate. In other words, the hybrid servo die cushion device described in Patent Literature 2 controls the pressure in the pressure line of the die cushion cylinder having a large flow rate, whereas the hydraulic pump (HP) of the first hydraulic circuit 140-1 controls the pilot pressure which is not affected by the die cushion flow rate so that the disturbance is reduced and the die cushion pressure may be excellently controlled.

Further, even in a case where the hydraulic oil pushed away from the lower chamber 120A of the first hydraulic cylinder 120 when the die cushion pressure acts has a large flow rate, because the flow rate can be covered by the logic valve 148, the slide speed may be increased. Thus, the present embodiment may be applied to a die cushion device that generates a large die cushion force. Further, the hydraulic pump (HP) and the servomotor (SM) which function as a pressure generator for generating the pilot pressure do not require a large flow rate because they require a flow rate just for generating the pilot pressure. Therefore, they may be configured by inexpensive devices (small capacity, small number) so that the die cushion device may be made inexpensive as a whole, and the space for the entire device may be saved.

<Second Mode of First Hydraulic Circuit>

Figure 4:
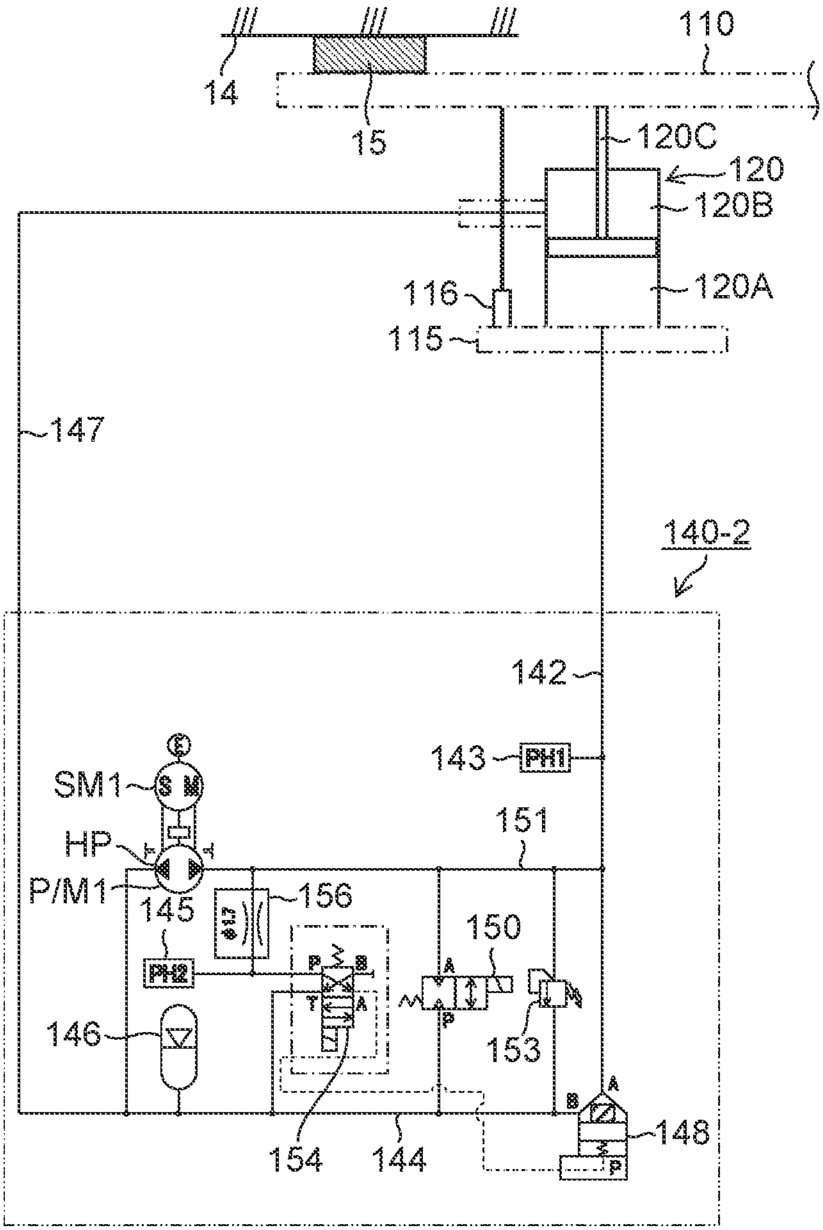
FIG. 4 is a diagram showing a second mode of the first hydraulic circuit for driving the first hydraulic cylinder of the die cushion device shown in FIG. 1.

FIG. 4 is a diagram showing a second mode of the first hydraulic circuit for driving the first hydraulic cylinder of the die cushion device shown in FIG. 1. In FIG. 4, components common to the first hydraulic circuit 140-1 according to the first mode shown in FIG. 2 are designated by the same reference numerals and characters, and detailed description thereof will be omitted.

In a first hydraulic circuit 140-2 shown in FIG. 4, a first hydraulic pump/motor (first hydraulic pump/motor) (P/M1) is arranged instead of the hydraulic pump (HP) of the first hydraulic circuit 140-1 shown in FIG. 2. In addition, the first hydraulic circuit 140-2 includes: a first hydraulic line 151 which connects the first hydraulic pump/motor (P/M1) and the die cushion pressure generation line 142; and a second hydraulic line (second hydraulic line) 147 which connects the upper chamber 120B of the first hydraulic cylinder 120 and the system pressure line 144. Further, an orifice 156 that functions as a throttle is arranged between the first hydraulic pump/motor (P/M1) and the second solenoid valve 154.

The first hydraulic circuit 140-2 may supply hydraulic oil from the first hydraulic pump/motor (P/M1) to the lower chamber 120A of the first hydraulic cylinder 120 via the first hydraulic line 151 and the die cushion pressure generation line 142. Further, the first hydraulic circuit 140-2 is configured to be capable of generating a die cushion pressure during the die cushion process by using the first hydraulic pump/motor (P/M1) and the logic valve 148 in combination.

<Second Mode of First Controller>

Figure 5:
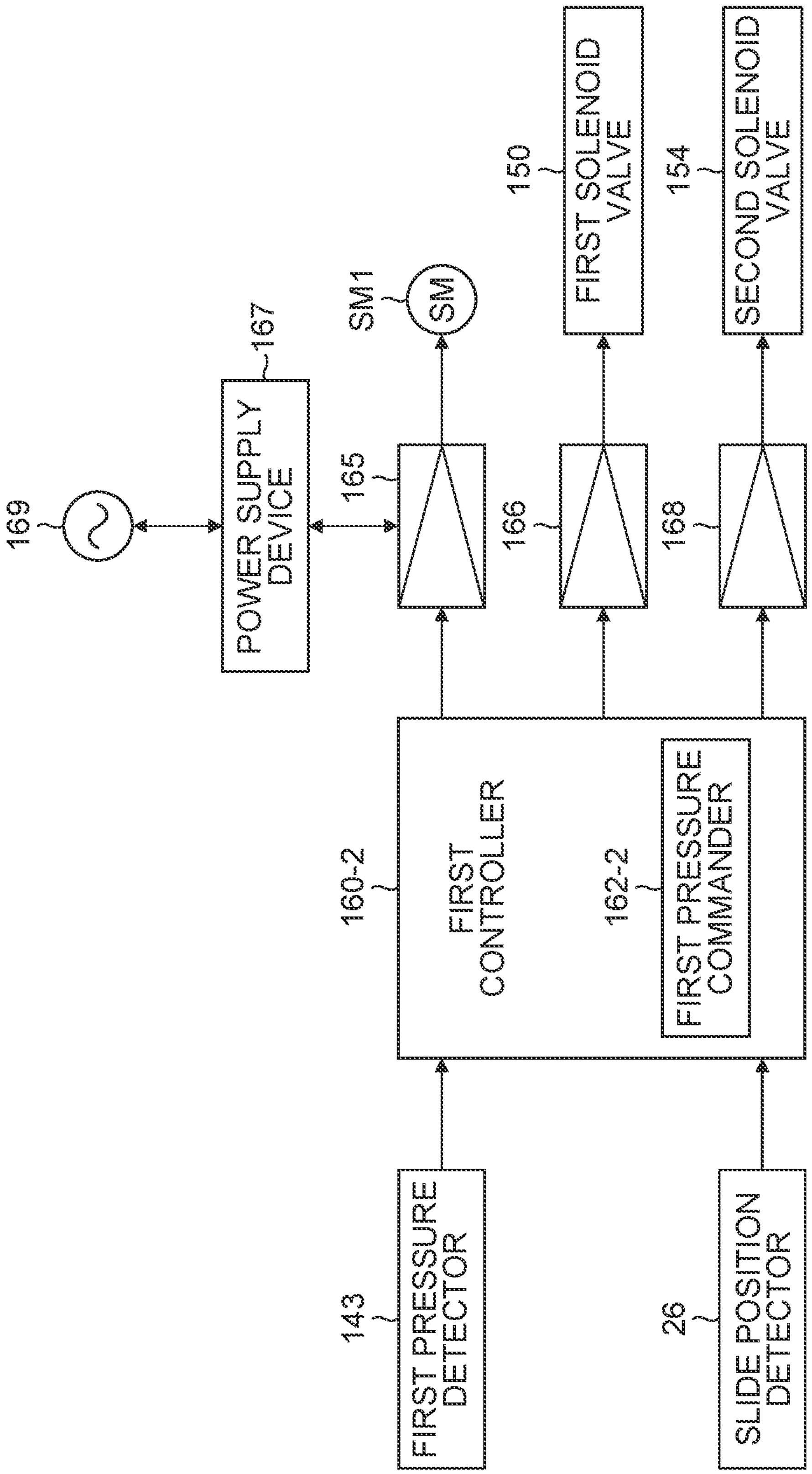
FIG. 5 is a block diagram showing a second mode of the first controller for controlling the first hydraulic circuit.

FIG. 5 is a block diagram showing a second mode of the first controller which controls the first hydraulic circuit, and particularly shows a first controller 160-2 which controls the first hydraulic circuit 140-2 shown in FIG. 4. In FIG. 5, components common to the first controller 160-1 shown in FIG. 3 are designated by the same reference numerals and characters, and detailed description thereof will be omitted.

The first controller 160-2 shown in FIG. 5 includes a first pressure commander 162-2. The first pressure commander 162-2 receives the slide position signal detected by the slide position detector 26 in order to output die cushion pressure commands (first pressure command, second pressure command) corresponding to the position of the slide 20.

The first pressure commander 162-2 is different from the first pressure commander 162-1 shown in FIG. 3 in that in addition to the first pressure command indicating the die cushion pressure, the first pressure commander 162-2 outputs the second pressure command for pre-pressurizing the pressure in the lower chamber 120A of the first hydraulic cylinder 120 to a preset pressure before press forming.

The first controller 160-2 calculates a torque command for driving the first servomotor (SM1) in order to pre-pressurize the lower chamber 120A of the first hydraulic cylinder 120 before press forming, calculates a torque command for driving the first servomotor (SM1) in order to generate a desired die cushion pressure in the lower chamber 120A of the first hydraulic cylinder 120 during press forming, and controls the driving of the first servomotor (SM1) based on the calculated torque commands.

When generating a pressure (pre-pressurization, die cushion pressure) in the lower chamber 120A of the first hydraulic cylinder 120, the first controller 160-2 sets each of the first solenoid valve 150 and the second solenoid valve 154 of the first hydraulic circuit 140-2 to an OFF state (switching position shown in FIG. 4). Since the first solenoid valve 150 is closed in the OFF state, the flow path between the die cushion pressure generation line 142 and the system pressure line 144 is closed. Further, the second solenoid valve 154, which is a 4-port 2-position solenoid valve, selects the pilot pressure out of two input pressures (pilot pressure and first system pressure) in the OFF state, the selected pilot pressure is applied to the pilot port P of the logic valve 148.

Here, as shown in FIG. 4, in a case where the cushion pad 110 is held at the die cushion standby position and before the slide position reaches the impact position (die cushion standby position), the first pressure commander 162-2 outputs the second pressure command for pre-pressurizing the lower chamber 120A of the first hydraulic cylinder 120 to the preset pressure (in this example, the second pressure command indicates the same pressure as the first pressure command indicating the die cushion pressure corresponding to the die cushion force during press forming).

The first controller 160-2 calculates a torque command for driving the first servomotor (SM1) based on the second pressure command for pre-pressurization output from the first pressure commander 162-2 and the pressure signal indicating the pressure in the lower chamber 120A of the first hydraulic cylinder 120 detected by the first pressure detector 143 in order to control the pressure in the lower chamber 120A of the first hydraulic cylinder 120 as instructed by the second pressure command. When the torque command is calculated, it is preferable to use an angular velocity of the drive shaft of the first servomotor (SM1), as an angular velocity feedback signal in order to ensure dynamic stability.

The first controller 160-2 outputs the torque command calculated using the second pressure command, the pressure signal, etc. to the first servomotor (SM1) via an amplifier/PWM controller (PWM: Pulse Width Modulation) 165 and drives the first hydraulic pump/motor (P/M1) as a hydraulic pump via the first servomotor (SM1), so as to supply hydraulic oil from the first hydraulic pump/motor (P/M1) to the lower chamber 120A of the first hydraulic cylinder 120.

Since the cushion pad 110 comes into contact with the upper limit stopper 15 and does not move upward, the pressure in the lower chamber 120A of the first hydraulic cylinder 120 is pressurized (pre-pressurized) up to the pressure corresponding to the second pressure command by the supply of hydraulic oil.

Subsequently, when the slide 20 of the press machine 10 moves downward and the slide position has reached the impact position (die cushion standby position), the cushion pad 110 subsequently moves downward along with the downward movement of the slide 20 (by downward pressing force from the slide 20).

Along with the downward movement of the cushion pad 110, the piston rod 120C of the first hydraulic cylinder 120 moves downward, and the hydraulic oil in the lower chamber 120A of the first hydraulic cylinder 120 is pushed away. A part of the hydraulic oil pushed away from the lower chamber 120A of the first hydraulic cylinder 120 flows into the system pressure line 144 via the die cushion pressure generation line 142, the first hydraulic line 151, and the first hydraulic pump/motor (P/M1). Further, the rest of the hydraulic oil pushed away from the lower chamber 120A of the first hydraulic cylinder 120 flows into the system pressure line 144 via the die cushion pressure generation line 142 and the logic valve 148.

Here, the first controller 160-2 calculates a torque command for driving the first servomotor (SM1) based on the first pressure command indicating the die cushion pressure and the pressure signal indicating the pressure in the lower chamber 120A of the first hydraulic cylinder 120 detected by the first pressure detector 143, in order to control the pressure in the lower chamber 120A of the first hydraulic cylinder 120 according to the first pressure command. When the torque command is calculated, it is preferable to use the angular velocity of the drive shaft of the first servomotor (SM1-1, SM1-2) as an angular velocity feedback signal for ensuring dynamic stability.

The first controller 160-2 outputs the torque command calculated using the pressure command, the pressure signal, etc. to the first servomotor (SM1) via the amplifier/PWM controller 165, thereby controlling the pressure in the lower chamber 120A of the first hydraulic cylinder 120.

Here, the torque output direction of the first servomotor (SM1) during the pressure control when the lower chamber 120A of the first hydraulic cylinder 120 is pre-pressurized is opposite to the torque output direction of the first servomotor (SM1) during a period (press forming period) in which the slide 20 moves downward, from a time when the slide 20 impacts on the cushion pad 110 (the upper die 30 mounted on the slide 20 impacts on the cushion pad 110 supported by the first hydraulic cylinder 120 via the blank, the blank holders 102 and the cushion pins 104) until a time when the slide 20 reaches the bottom dead center.

That is, the hydraulic oil which is pushed away from the lower chamber 120A of the first hydraulic cylinder 120 by the power applied to the cushion pad 110 from the slide 20, flows into the first hydraulic pump/motor (P/M1) so that the first hydraulic pump/motor (P/M1) acts as a hydraulic motor (hydraulic motor). The first servomotor (SM1) is driven by (follows) the first hydraulic pump/motor (P/M1) to act as a generator.

In other words, the force transmitted from the slide 20 to the first hydraulic cylinder 120 via the cushion pad 110 compresses the lower chamber 120A of the first hydraulic cylinder 120 to generate the die cushion pressure. At the same time, the die cushion pressure causes the first hydraulic pump/motor (P/M1) to act as a hydraulic motor. When a rotating shaft torque generated in the first hydraulic pump/motor (P/M1) resists the driving torque of the first servomotor (SM1), the first servomotor (SM1) is rotated to control the die cushion pressure.

The electric power generated by the first servomotor (SM1) during the generation of the die cushion pressure is regenerated to an AC power supply 169, via the amplifier/PWM controller 165 and a DC power supply device 167 having a power regeneration function.

Further, the pressure on the inflow side of the first hydraulic pump/motor (P/M1) is applied as a pilot pressure to the pilot port P of the logic valve 148 via the orifice 156 and the second solenoid valve 154. However, the rest of the hydraulic oil that cannot be covered by the first hydraulic pump/motor (P/M1) out of the hydraulic oil pushed away from the lower chamber 120A of the first hydraulic cylinder 120, flows from the A port connected to the die cushion pressure generation line 142 of the logic valve 148 to the low-pressure system pressure line 144.

After the press forming, the first controller 160-2 may control the first hydraulic circuit 140-2 as in the case of the first controller 160-1 shown in FIG. 3.

According to the die cushion device including the first hydraulic circuit 140-2 and the first controller 160-2, the hydraulic oil may be supplied from the first hydraulic pump/motor (P/M1) to the lower chamber 120A of the first hydraulic cylinder 120 via the first hydraulic line 151 and the die cushion pressure generation line 142 in the state where the cushion pad 110 is on standby at the cushion standby position where the cushion pad 110 is in contact with the upper limit stopper 15 as shown in FIG. 4. As a result, it may be possible to pressurize (pre-pressurize) the lower chamber 120A of the first hydraulic cylinder 120 before press forming.

Further, when the cushion pad 110 moves downward together with the slide 20 during press forming, the hydraulic oil is pushed away from the lower chamber 120A of the first hydraulic cylinder 120. A part of the hydraulic oil pushed away from the lower chamber 120A of the first hydraulic cylinder 120 flows into the system pressure line 144 via the die cushion pressure generation line 142, the first hydraulic line 151, and the first hydraulic pump/motor (P/M1). The rest of the hydraulic oil pushed away from the lower chamber 120A of the first hydraulic cylinder 120 flows into the system pressure line 144 via the die cushion pressure generation line 142 and the logic valve 148. Here, following the downward movement of the cushion pad 110, hydraulic oil of system pressure is supplied from the system pressure line 144 to the upper chamber 120B of the first hydraulic cylinder 120 via the second hydraulic line 147.

A part of the hydraulic oil pushed away from the lower chamber 120A of the first hydraulic cylinder 120 is discharged via the first hydraulic pump/motor (P/M1) so that the first hydraulic pump/motor (P/M1) acts as a hydraulic motor (load). Therefore, the first hydraulic pump/motor (P/M1) and the first servomotor (SM1) may contribute to a part of the die cushion force generated by the cushion pad 110. Further, the rest of the hydraulic oil pushed away from the lower chamber 120A of the first hydraulic cylinder 120 is discharged via the logic valve 148 functioning as a throttle, so that the logic valve 148 may contribute to a part of the die cushion force generated by the cushion pad 110. Still further, since hydraulic oil having a large flow rate may flow through the logic valve 148, the capacity of the first servomotor (SM1) for driving the first hydraulic pump/motor (P/M1) may be reduced.

Further, because the first servomotor (SM1) is rotated in a direction which allows the hydraulic oil to be fed into the lower chamber 120A of the first hydraulic cylinder 120, it is possible to freely control the ascending speed in the knockout process. By applying the torque of the first servomotor (SM1) in this process, the pressure in the lower chamber 120A of the first hydraulic cylinder 120 may be increased. As a result, it may be possible to generate a larger knockout force than that caused by a pressure which depends on the first accumulator 146.

[Second Embodiment of Die Cushion Device]

Figure 6:
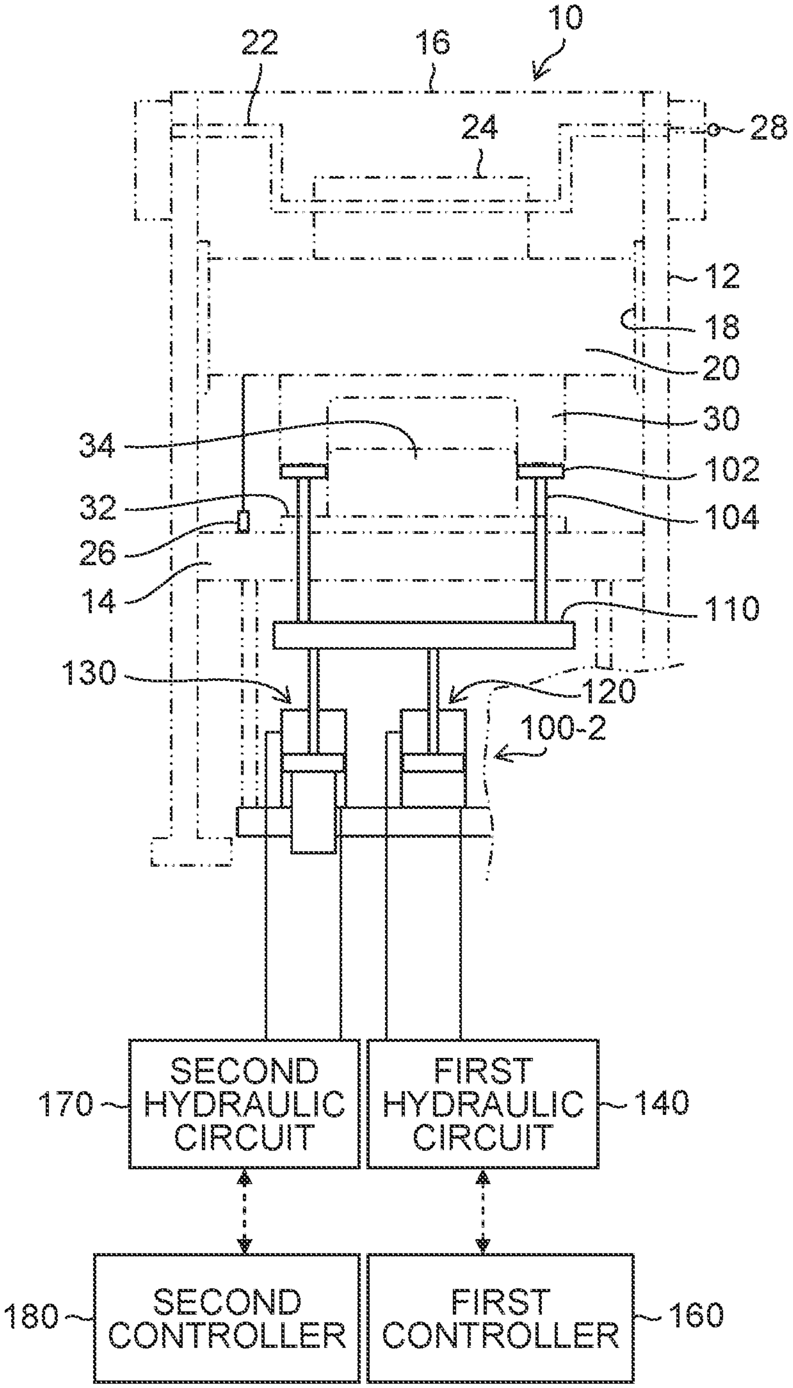
FIG. 6 is a configuration diagram showing a press machine including a die cushion device according to a second embodiment.

FIG. 6 is a configuration diagram showing a press machine including a die cushion device of a second embodiment. In FIG. 6, components common to the die cushion device of the first embodiment shown in FIG. 1 are designated by the same reference numerals and characters, and detailed description thereof will be omitted.

A die cushion device 100-2 according to the second embodiment shown in FIG. 6 is different from the die cushion device 100-1 shown in FIG. 1 in that: (1) the die cushion device 100-2 includes a second hydraulic cylinder 130 configured to support the cushion pad 110 and move the cushion pad 110 in the up and down direction, in addition to the first hydraulic cylinder 120; and (2) the die cushion device 100-2 further includes a second hydraulic circuit 170 for driving the second hydraulic cylinder 130 and a second controller 180 for controlling the second hydraulic circuit 170.

The piston rod 120C of the second hydraulic cylinder 130 shown in FIG. 6 is coupled to the lower surface of the cushion pad 110.

It is preferable that a cross-sectional area of an upper chamber 130B of the second hydraulic cylinder 130 in this example be larger than the cross-sectional area of the lower chamber 120A of the first hydraulic cylinder 120, and it is preferable that a cross-sectional area of a lower chamber 130A of the second hydraulic cylinder 130 be smaller than the cross-sectional area of the upper chamber 130B of the second hydraulic cylinder 130.

As described later, in a case where the cross-sectional area of the upper chamber 130B of the second hydraulic cylinder 130 is increased, the pressure in the upper chamber 130B is low even when a downward load (=the reaction force of an upward load caused by pre-pressurization) is increased. When the pressure in the upper chamber 130B is low, the depressurization of the upper chamber 130B at the time of impact may be accelerated. (This is because the time for reduction from the pressure caused by the reaction force to the system pressure is a negligible level.) As a result, it may be possible to generate a predetermined cushion force by the lower chamber 120A of the first hydraulic cylinder 120 immediately after the impact. Further, by reducing the cross-sectional area of the lower chamber 130A of the second hydraulic cylinder 130, it is possible to increase the speed of the upward movement of the piston rod 130C (cushion pad 110) with respect to the supply amount of hydraulic oil to the lower chamber 130A of the second hydraulic cylinder 130.

[First Mode of Hydraulic Circuit, Etc. to be Applied to Die Cushion Device According to Second Embodiment]

Figure 7:
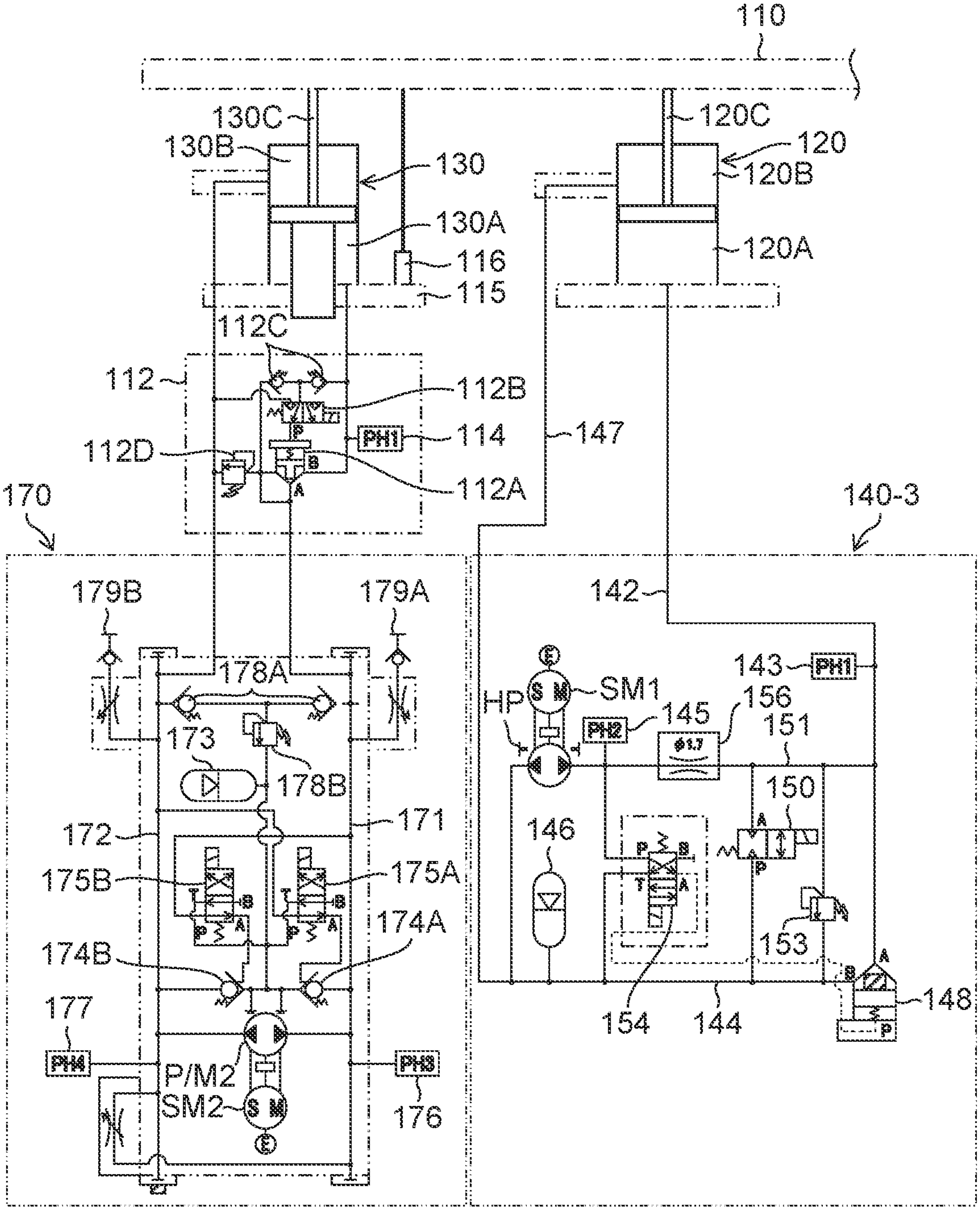
FIG. 7 is a diagram showing a first mode of a hydraulic circuit, etc. to be applied to the die cushion device according to the second embodiment.

FIG. 7 is a diagram showing a first mode of a hydraulic circuit, etc. to be applied to the die cushion device according to the second embodiment, and particularly shows a first mode of a first hydraulic circuit 140-3 and a second hydraulic circuit 170.

In the first hydraulic circuit 140-3 shown in FIG. 7, components common to the first hydraulic circuit 140-2 shown in FIG. 4 are designated by the same reference numerals and characters, and detailed description thereof will be omitted.

The first hydraulic circuit 140-3 shown in FIG. 7 is different from the first hydraulic circuit 140-2 shown in FIG. 4 in that a hydraulic pump (HP) is arranged instead of the first hydraulic pump/motor (P/M1), and an orifice 156 functioning as a throttle is arranged in the first hydraulic line 151.

Similarly to the first hydraulic circuit 140-1 shown in FIG. 2, the first hydraulic circuit 140-3 is configured to be capable of generating the die cushion pressure corresponding to the pilot pressure in the die cushion process by driving the hydraulic pump (HP) with the first servomotor (SM1) to control the pilot pressure to be applied to the pilot port P of the logic valve 148.

For example, the first hydraulic circuit 140-3 is configured to set each of the first solenoid valve 150 and the second solenoid valve 154 to an OFF state and drive the hydraulic pump (HP) with the first servomotor (SM1) so as to pressurize (pre-pressurize) the lower chamber 120A of the first hydraulic cylinder 120 via the first hydraulic line 151 having the orifice 156 arranged therein and the die cushion pressure generation line 142, in a case where the cushion pad 110 is held at the die cushion standby position and the cushion pad is not moved. Note that when the lower chamber 120A of the first hydraulic cylinder 120 is pre-pressurized, because the pilot pressure corresponding to the pressure caused by the pre-pressurization is applied from the hydraulic pump (HP) to the pilot port P of the logic valve 148 and the logic valve 148 is closed, the hydraulic oil in the lower chamber 120A of the first hydraulic cylinder 120 does not flow into the system pressure line 144 via the logic valve 148.

According to the die cushion device including the first hydraulic circuit 140-3, similarly to the die cushion device including the first hydraulic circuit 140-1 shown in FIG. 2, when the die cushion pressure acts, the hydraulic oil pushed away from the lower chamber 120A of the first hydraulic cylinder 120 is discharged to the low-pressure source side of the first system pressure via the pilot-operated logic valve 148 so that the die cushion pressure may be generated. Particularly, the pilot pressure acting on the pilot port P of the logic valve 148 is servo-controlled by using the first servomotor (SM1) and the hydraulic pump (HP) based on the first pressure command and the pressure in the lower chamber 120A of the first hydraulic cylinder 120, so that the die cushion pressure (die cushion force) may be excellently controlled.

That is, the die cushion device including the first hydraulic circuit 140-3 has better responsiveness to the control of the pilot pressure, as compared with the die cushion device described in Patent Literature 1 in which the pilot pressure is generated by the pilot relief valve. Thus, it is possible to shorten the time until the die cushion pressure reaches a predetermined pressure (accelerate the increase of the die cushion pressure at the beginning of pressure increase).

Further, the hybrid servo die cushion device described in Patent Literature 2 in which each of the proportional valve and the hydraulic pump/motor is subjected to servo control suffers a large disturbance because the hydraulic pump/motor serving as a pressure generator directly receives a large flow rate from the die cushion cylinder. On the other hand, the first hydraulic circuit 140-3 includes the hydraulic pump (HP) functioning as a pressure generator in the pilot pressure line having no (little) flow rate, and thus suffers a little disturbance. In other words, the hybrid servo die cushion device described in Patent Literature 2 controls the pressure in the pressure line of the die cushion cylinder having a large flow rate, whereas the first hydraulic circuit 140-3 may control the pilot pressure which is hardly affected by the flow rate pushed away from the lower chamber 120A of the first hydraulic cylinder 120 because the hydraulic pump (HP) of the first hydraulic circuit 140-3 is connected to the die cushion pressure generation line 142 via the orifice 156. Therefore, the first hydraulic circuit 140-3 suffers a little disturbance, and may excellently control the pilot pressure.

On the other hand, the first hydraulic circuit 140-3 cannot cause the hydraulic oil for moving the first hydraulic cylinder 120 to flow to the first hydraulic cylinder 120. Thus, the first hydraulic circuit 140-3 cannot move the cushion pad 110 in the up and down direction.

<Second Hydraulic Circuit>

The second hydraulic circuit 170 is configured to be capable of driving the second hydraulic cylinder 130 so as to move the cushion pad 110 in the up and down direction, and hold the cushion pad 110 at a desired position. In addition, the second hydraulic circuit 170 is configured to perform pressure control on the second hydraulic cylinder 130.

The piston rod 130C of the second hydraulic cylinder 130 is coupled to the lower surface of the cushion pad 110, like the first hydraulic cylinder 120. The lower chamber 130A of the second hydraulic cylinder 130 is connected to a hydraulic line 171 of the second hydraulic circuit 170 via a hydraulic circuit 112 having a deadweight fall preventing function. The upper chamber 130B of the second hydraulic cylinder 130 is connected to the hydraulic line 172 of the second hydraulic circuit 170 via the hydraulic circuit 112.

When hydraulic oil is supplied from one of the hydraulic lines 171 and 172 to the second hydraulic cylinder 130, the other hydraulic line is switched to a second system pressure, which is a low pressure, as described later. When hydraulic oil is supplied from the other hydraulic line of the hydraulic lines 171 and 172 to the second hydraulic cylinder 130, the one hydraulic line is switched to the second system pressure.

The hydraulic circuit 112 having the deadweight fall preventing function has a function of supporting weight of the cushion pad 110 and the like. The hydraulic circuit 112 includes a logic valve 112A, a solenoid valve 112B for switching the pilot pressure to the logic valve 112A, a pair of check valves 112C, a relief valve 112D and a second pressure detector 114.

The pressure in the lower chamber 130A of the second hydraulic cylinder 130 (or the hydraulic line 171) or the pressure in the upper chamber 130B of the second hydraulic cylinder 130 (the hydraulic line 172) is applied to the pilot port of the logic valve 112A by turning on/off the solenoid valve 112B.

When the solenoid valve 112B is set to OFF in a state where the press machine 10 (die cushion device) is not operated (in the case of a state shown in FIG. 7), the pressure in the lower chamber 130A of the second hydraulic cylinder 130 (a pressure which is higher than the pressure of the hydraulic line 171 by the amount corresponding to the weight) is applied to the pilot port P of the logic valve 112A, and the logic valve 112A is closed. As a result, the hydraulic oil in the lower chamber 130A of the second hydraulic cylinder 130 does not flow out from the lower chamber 130A, and the second hydraulic cylinder 130 may support the weight of the cushion pad 110 and the like.

Further, when hydraulic oil is supplied to the lower chamber 130A of the second hydraulic cylinder 130 in order to move the cushion pad 110 upward, the solenoid valve 112B is set to ON. Note that when the cushion pad 110 is moved upward, hydraulic oil whose pressure is higher than the second system pressure is supplied to the hydraulic line 171 as described later, and the hydraulic line 172 is depressurized to the second system pressure.

When the solenoid valve 112B is set to ON, the second system pressure is applied to the pilot port P of the logic valve 112A on the upper chamber 130B side of the second hydraulic cylinder 130 (on the hydraulic line 172 side). Since the second system pressure is lower than the pressure of the hydraulic line 171 when the hydraulic oil is supplied to the lower chamber 130A of the second hydraulic cylinder 130, the logic valve 112A opens. As a result, the hydraulic oil may be supplied from the hydraulic line 171 to the lower chamber 130A of the second hydraulic cylinder 130 via the logic valve 112A, and the hydraulic oil pushed away from the upper chamber 130B of the second hydraulic cylinder 130 flows to the hydraulic line 172 having the second system pressure.

Further, when the hydraulic oil is supplied to the upper chamber 130B of the second hydraulic cylinder 130 in order to move the cushion pad 110 downward, the solenoid valve 112B is set to OFF. Note that when the cushion pad 110 is moved downward, hydraulic oil whose pressure is higher than the second system pressure is supplied to the hydraulic line 172 as described later, and the hydraulic line 171 is depressurized to the second system pressure.

When the solenoid valve 112B is set to OFF, the second system pressure is applied to the pilot port P of the logic valve 112A on the lower chamber 130A side of the second hydraulic cylinder 130 (on the hydraulic line 171 side). Since the second system pressure is lower than the pressure of the hydraulic line 171 when the hydraulic oil is supplied to the upper chamber 130B of the second hydraulic cylinder 130, the logic valve 112A opens. As a result, the hydraulic oil may be supplied from the hydraulic line 172 to the upper chamber 130B of the second hydraulic cylinder 130, and the hydraulic oil pushed away from the lower chamber 130A of the second hydraulic cylinder 130 flows into the hydraulic line 171 of the second system pressure via the logic valve 112A.

The second pressure detector 114 detects the pressure in the lower chamber 130A of the second hydraulic cylinder 130. Further, the hydraulic circuit 112 having the dead-weight fall preventing function is not an essential constituent element of the die cushion device according to the second embodiment.

The second hydraulic circuit 170 includes: a second hydraulic pump/motor (second hydraulic pump/motor) (P/M2) connected between the hydraulic line 171 and the hydraulic line 172; a second servomotor (SM2) connected to the rotating shaft of the second hydraulic pump/motor (P/M2); a second accumulator 173 configured to accumulate hydraulic oil having the second system pressure; a first pilot check valve 174A provided in a flow path between the lower chamber 130A of the second hydraulic cylinder 130 and the second accumulator 173; a second pilot check valve 174B provided in a flow path between the upper chamber 130B of the second hydraulic cylinder 130 and the second accumulator 173; solenoid valves 175A and 175B configured to apply pilot pressures to open the first pilot check valve 174A and the second pilot check valve 174B respectively; and pressure detectors 176 and 177 configured to detect the pressures of the hydraulic lines 171 and 172, respectively.

Further, a pair of check valves 178A are arranged between the hydraulic lines 171 and 172. A relief valve 178B configured to prevent occurrence of an abnormal pressure, is provided between the check valves 178A and the second accumulator 173.

The second hydraulic circuit 170 is supplied with hydraulic oil from an oil supply device (not shown) through couplers 179A and 179B with check valves connected to hydraulic lines 171 and 172, so that hydraulic oil having the predetermined second system pressure is filled and sealed in the second hydraulic circuit 170.

The hydraulic oil having the second system pressure is accumulated in the second accumulator 173 connected to the hydraulic lines 171 and 172 via the first pilot check valve 174A and the second pilot check valve 174B, respectively. It is preferable that the second system pressure be set to a pressure in a range of 0.1 MPa to 1.0 MPa.

The second hydraulic pump/motor (P/M2) is configured to be capable of discharging hydraulic oil from two ports. One of the two ports of the second hydraulic pump/motor (P/M2) is connected to the hydraulic line 171 and the other port of the two ports of the second hydraulic pump/motor (P/M2) is connected to the hydraulic line 172.

The solenoid valves 175A and 175B shown in FIG. 7 are all set to the OFF state. When the cushion pad 110 is moved upward, the solenoid valve 175A is set to ON, and the solenoid valve 175B is set to OFF. On the other hand, when the cushion pad 110 is moved downward, the solenoid valve 175A is set to OFF, and the solenoid valve 175B is set to ON.

When the cushion pad 110 is moved upward, the second servomotor (SM2) drives the second hydraulic pump/motor (P/M2) so that pressure oil is supplied from one port of the second hydraulic pump/motor (P/M2) via the hydraulic line 171 and the hydraulic circuit 112, to the lower chamber 130A of the second hydraulic cylinder 130. When the cushion pad 110 is moved downward, the second servomotor (SM2) drives the second hydraulic pump/motor (P/M2) so that pressure oil is supplied from the other port of the second hydraulic pump/motor (P/M2) via the hydraulic line 172 and the hydraulic circuit 112, to the upper chamber 130B of the second hydraulic cylinder 130.

When the cushion pad 110 is moved upward (when the lower chamber 130A of the second hydraulic cylinder 130 is pressurized), the second hydraulic pump/motor (P/M2) is driven so that pressure oil is supplied to the lower chamber 130A of the second hydraulic cylinder 130. In this case, the solenoid valve 175A is set to ON, and the second system pressure accumulated in the second accumulator 173 is applied to the first pilot check valve 174A via the solenoid valve 175A. Therefore, the first pilot check valve 174A maintains the closed state.

On the other hand, the solenoid valve 175B is set to OFF, and the pressure of the hydraulic line 171 (the lower chamber 130A of the second hydraulic cylinder 130) is applied to the second pilot check valve 174B via the solenoid valve 175B, so that the second pilot check valve 174B is opened, and the pressure in the upper chamber 130B of the second hydraulic cylinder 130 is depressurized to the second system pressure.

As a result, the hydraulic oil discharged from one port of the second hydraulic pump/motor (P/M2) is supplied to the lower chamber 130A of the second hydraulic cylinder 130 via the hydraulic line 171 and the hydraulic circuit 112. In addition, the hydraulic oil which is pushed away from the upper chamber 130B of the second hydraulic cylinder 130 along with the upward movement of the piston rod 130C of the second hydraulic cylinder 130 (cushion pad 110) flows into the other port of the second hydraulic pump/motor (P/M2) via the hydraulic line 172, and also is accumulated in the second accumulator 173 via the second pilot check valve 174B.

When the cushion pad 110 is moved downward (when the upper chamber 130B of the second hydraulic cylinder 130 is pressurized), the second hydraulic pump/motor (P/M2) is driven so that the pressure oil is supplied to the upper chamber 130B of the second hydraulic cylinder 130. In this case, because the solenoid valve 175B is set to ON and the second system pressure accumulated in the second accumulator 173 is applied to the second pilot check valve 174B via the solenoid valve 175B, the second pilot check valve 174B maintains the closed state.

On the other hand, since the solenoid valve 175A is set to OFF and the pressure of the hydraulic line 172 (the upper chamber 130B of the second hydraulic cylinder 130) is applied to the first pilot check valve 174A via the solenoid valve 175A, the first pilot check valve 174A is opened and the pressure in the lower chamber 130A of the second hydraulic cylinder 130 is depressurized to the second system pressure.

As a result, the hydraulic oil discharged from the other port of the second hydraulic pump/motor (P/M2) is supplied to the upper chamber 130B of the second hydraulic cylinder 130 via the hydraulic line 172, and the hydraulic oil pushed away from the lower chamber 130A of the second hydraulic cylinder 130 along with the downward movement of the piston rod 130C of the second hydraulic cylinder 130 (the cushion pad 110) is sucked into one port of the second hydraulic pump/motor (P/M2). Here, because the cross-sectional area of the upper chamber 130B of the second hydraulic cylinder 130 is larger than the cross-sectional area of the lower chamber 130A, a part of the hydraulic oil flowing into the second hydraulic pump/motor (P/M2) is supplied from the second accumulator 173 when the cushion pad 110 is moved downward.

In this way, the second hydraulic pump/motor (P/M2) may move the cushion pad 110 upward by supplying hydraulic oil to the lower chamber 130A of the second hydraulic cylinder 130, and may move the cushion pad 110 downward by supplying hydraulic oil to the upper chamber 130B of the second hydraulic cylinder 130.

<Second Controller>

Next, the second controller 180 for controlling the second hydraulic circuit 170 that drives the second hydraulic cylinder 130 will be described.

Figure 8:
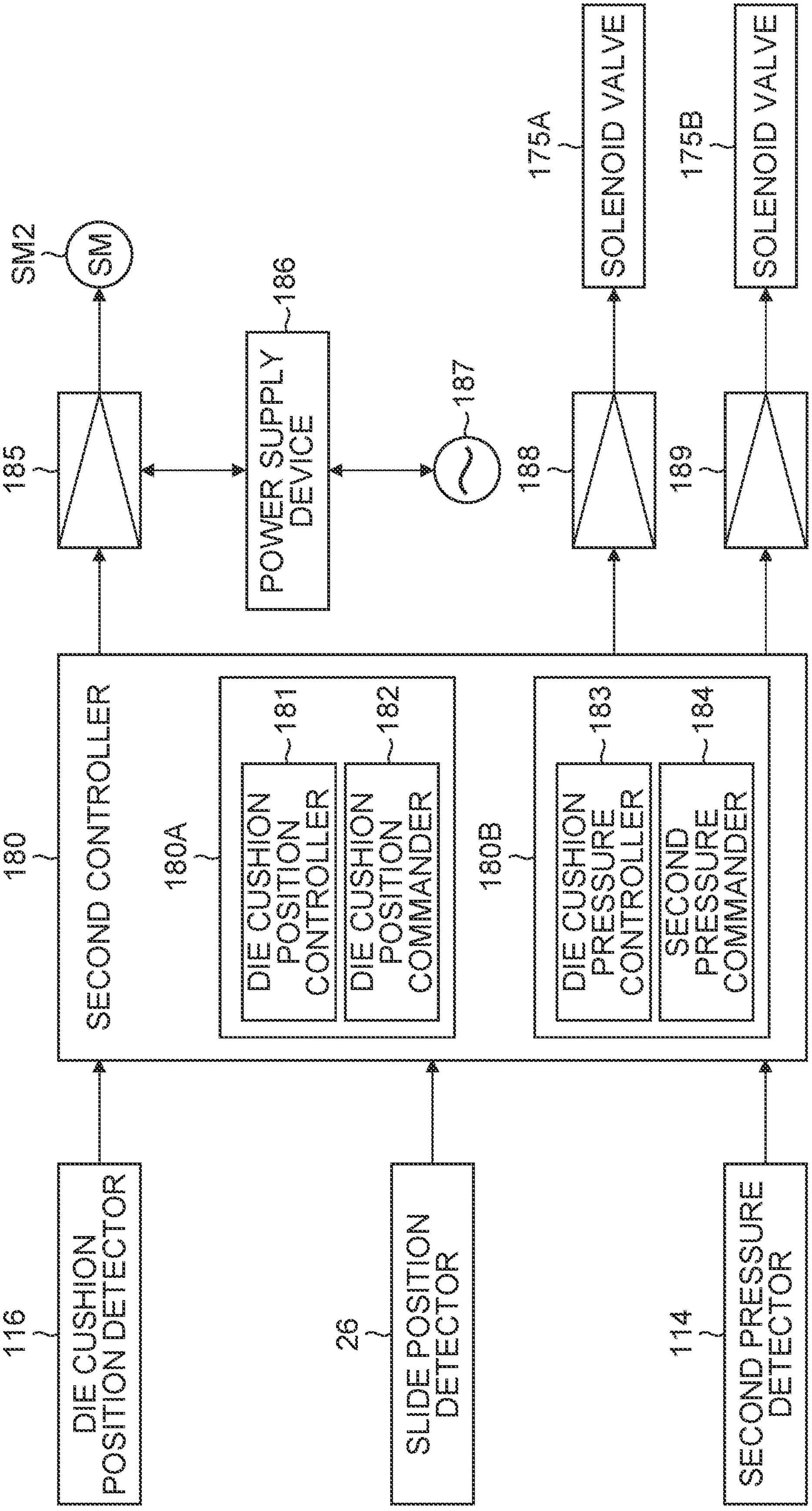
FIG. 8 is a block diagram showing a first mode of a second controller for controlling a second hydraulic circuit.

FIG. 8 is a block diagram showing a first mode of the second controller for controlling the second hydraulic circuit.

As shown in FIG. 8, the second controller 180 according to the first mode receives: a die cushion position signal indicating the position of the cushion pad 110 (die cushion position) from the die cushion position detector 116; a slide position signal indicating the position of the slide 20 from the slide position detector 26; and a pressure signal indicating the pressure in the lower chamber 130A of the second hydraulic cylinder 130 from the second pressure detector 114.

The second controller 180 of this example includes a die cushion position control unit 180A and a die cushion pressure control unit 180B.

The die cushion position control unit 180A includes a die cushion position controller 181 and a die cushion position commander 182. The die cushion position commander 182 receives the slide position signal from the slide position detector 26, and outputs a die cushion position command for controlling the position of the cushion pad 110 in a period other than the press forming period, based on the received slide position signal.

In this example, the die cushion position commander 182 outputs: a first die cushion position command for causing the cushion pad 110 to stand by at the die cushion standby position before press forming; a second die cushion position command for accelerating (pre-accelerating) the cushion pad 110 until the cushion pad 110 reaches the impact position from the die cushion standby position after the first die cushion position command is output; a fourth die cushion position command for holding the cushion pad 110 at the position corresponding to the bottom dead center of the slide 20; a fifth die cushion position command for moving the cushion pad 110 to the die cushion standby position after the fourth die cushion position command is output for a certain period of time, etc.

When the second hydraulic cylinder 130 is in a position control state, the die cushion position controller 181 calculates a torque command for controlling the second servomotor (SM2) based on the die cushion position command output from the die cushion position commander 182 and the die cushion position signal detected by the die cushion position detector 116, in order to move or keep the cushion pad 110 to or at a position corresponding to the die cushion position command. When calculating the torque command, it is preferable that the angular velocity of the drive shaft of the second servomotor (SM2) be used as an angular velocity feedback signal for ensuring dynamic stability.

When the second hydraulic cylinder 130 is in the position control state, the die cushion position controller 181 of the second controller 180 outputs the torque command calculated using the die cushion position command, the die cushion position signal and the like to the second servomotor (SM2) via the amplifier/PWM controller 185, thereby moving the piston rod 130C of the second hydraulic cylinder 130 (the cushion pad 110) in the up and down direction, or holding the cushion pad 110 at a desired position.

When outputting a torque command for supplying hydraulic oil to the lower chamber 130A of the second hydraulic cylinder 130, the die cushion position controller 181 outputs a drive signal for setting the solenoid valve 175A to ON to the solenoid valve 175A via the amplifier 188, so that hydraulic oil may be supplied to the lower chamber 130A of the second hydraulic cylinder 130 and may be discharged from the upper chamber 130B of the second hydraulic cylinder 130. Further, when outputting a torque command for supplying hydraulic oil to the upper chamber 130B of the second hydraulic cylinder 130, the die cushion position controller 181 outputs a drive signal for setting the solenoid valve 175B to ON to the solenoid valve 175B via the amplifier 189, so that hydraulic oil may be supplied to the upper chamber 130B of the second hydraulic cylinder 130 and may be discharged from the lower chamber 130A of the second hydraulic cylinder 130.

On the other hand, the die cushion pressure control unit 180B includes a die cushion pressure controller 183 and a second pressure commander 184. The second pressure commander 184 receives the slide position signal from the slide position detector 26, and outputs a die cushion pressure command (third pressure command) for controlling the pressure of the second hydraulic cylinder 130 during the press forming period, based on the received slide position signal.

In this example, the second pressure commander 184 outputs a pressure command corresponding to an auxiliary die cushion force that assists the die cushion force (main die cushion force) generated by the first hydraulic cylinder 120 during the press forming, or outputs a pressure command for making the die cushion force generated by the second hydraulic cylinder 130 zero.

When the second hydraulic cylinder 130 is in the pressure control state, the die cushion pressure controller 183 calculates a torque command for driving the second servomotor (SM2) based on the die cushion pressure command output from the second pressure commander 184 and the pressure signal output from the second pressure detector 114 in order to control the pressure in the lower chamber 130A of the second hydraulic cylinder 130 according to the pressure command. When calculating the torque command, it is preferable that the angular velocity of the drive shaft of the second servomotor (SM2) be used as an angular velocity feedback signal for ensuring dynamic stability.

When the second hydraulic cylinder 130 is in the pressure control state, the die cushion pressure controller 183 of the second controller 180 outputs the torque command calculated using the pressure command, the pressure signal, etc. to the second servomotor (SM2) via the amplifier/PWM controller 185, thereby controlling the pressure in the lower chamber 130A of the second hydraulic cylinder 130 to the pressure corresponding to the auxiliary die cushion force or controlling the die cushion force generated by the second hydraulic cylinder 130 to be zero.

Here, when outputting the torque command for supplying hydraulic oil to the lower chamber 130A of the second hydraulic cylinder 130, the die cushion pressure controller 183 outputs a drive signal for setting the solenoid valve 175A to ON to the solenoid valve 175A via the amplifier 188, so that the lower chamber 130A of the second hydraulic cylinder 130 may be pressurized and the pressure in the upper chamber 130B is set to the second system pressure.

When the second hydraulic cylinder 130 is controlled to generate the auxiliary die cushion force, the second servomotor (SM2) acts as a generator. Electric power generated by the second servomotor (SM2) is regenerated to an AC power supply 187 via the amplifier/PWM controller 185 and a DC power supply device 186 having a power regeneration function.

On the other hand, when the pressure of the second hydraulic cylinder 130 is controlled so that the die cushion force generated by the second hydraulic cylinder 130 is equal to zero, the second hydraulic cylinder 130 does not hinder the die cushion force generated by the first hydraulic cylinder 120.

The position control of the second hydraulic cylinder 130 by the die cushion position control unit 180A and the pressure control of the second hydraulic cylinder 130 by the die cushion pressure control unit 180B may be switched to each other according to the position of the slide 20 and the crank angle detected by the crankshaft encoder 28.

Note that, the second controller 180 may be configured to perform only the position control on the second hydraulic cylinder 130. In this case, the die cushion pressure control unit 180B is unnecessary in the second controller 180.

Further, it is preferable that, during the press forming, the die cushion position commander 182 of the die cushion position control unit 180A output a die cushion position command (third die cushion position command) corresponding to the position of the slide 20 and the die cushion position controller 181 perform the position control on the second hydraulic cylinder 130 based on the third die cushion position command and the die cushion position signal. As a result, the position control may be performed on the second hydraulic cylinder 130 so that the die cushion force generated by the first hydraulic cylinder 120 is not hindered.

In this example, when the pressure control is performed on the first hydraulic cylinder 120 and the second hydraulic cylinder 130, the pressure of the upper chamber 120B of the first hydraulic cylinder 120 (first system pressure) and the pressure of the upper chamber 130B of the second hydraulic cylinder 130 (second system pressure) are not taken into consideration for simplicity of description. However, in order to accurately control the die cushion force generated by the cushion pad 110, it is desirable to take the pressure in the upper chamber 120B of the first hydraulic cylinder 120, etc. into consideration.

<First Control Method of Die Cushion Device of Second Embodiment>

Next, a first control method of the die cushion device according to the second embodiment will be described.

Figure 9:
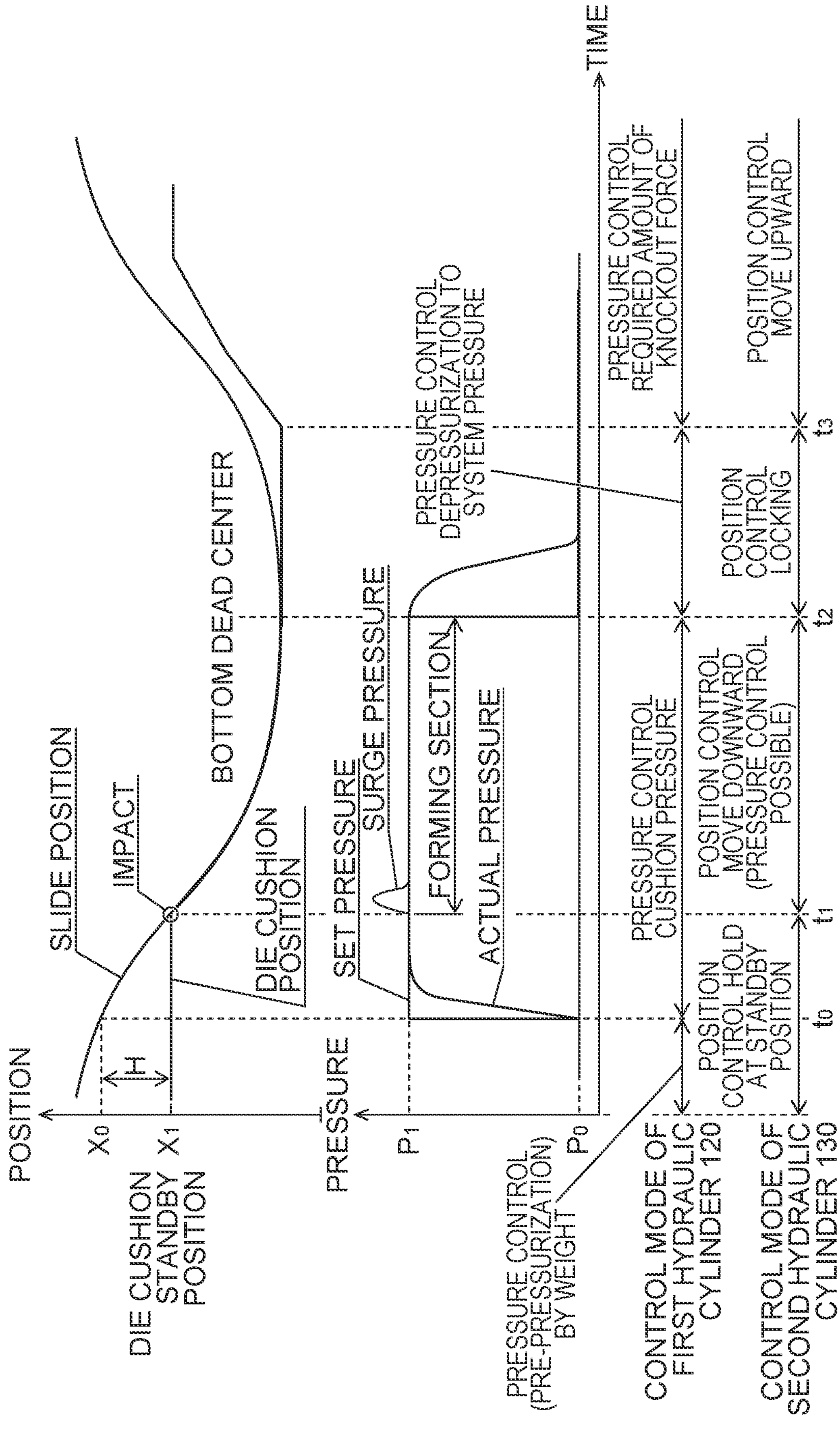
FIG. 9 is a waveform diagram showing a slide position, a die cushion position, a pressure command (set pressure), and an actual pressure in one press cycle in a case where the die cushion device is controlled by a first control method.

FIG. 9 is a waveform diagram showing a slide position, a die cushion position, a pressure command (set pressure), and an actual pressure in one press cycle when the die cushion device is controlled by the first control method.

The first control method of the die cushion device 100-2 is particularly characterized in that the pressure in the lower chamber 120A of the first hydraulic cylinder 120 is pre-pressurized to a preset pressure before press forming.

Before the press forming, the downward pressing force from the slide 20 of the press machine 10 is not applied to the cushion pad 110. Thus, the lower chamber 120A of the first hydraulic cylinder 120 cannot be pre-pressurized unless the cushion pad 110 comes into contact with the upper limit stopper 15 as shown in FIG. 2 so as to restrict the upward movement of the cushion pad 110.

Therefore, when the cushion pad 110 is pre-pressurized before the press forming, the die cushion device 100-2 performs the die cushion pressure control and the die cushion position control at the same time. That is, the die cushion device 100-2 performs the pressure control on the first hydraulic cylinder 120 to perform pre-pressurization, and performs the position control on the second hydraulic cylinder 130 so that the cushion pad 110 does not move from the die cushion standby position.

In the one-cycle waveform diagram shown in FIG. 9, before a time to when the pre-pressurization is started, it is preferable that the first controller 160 for controlling the first hydraulic circuit 140-3 shown in FIG. 7 perform the pressure control on the first hydraulic cylinder 120 so that the first hydraulic cylinder 120 secondarily (auxiliary) supports the load corresponding to the weight of the cushion pad 110, etc. in a state where the second controller 180 performs the position control on the second hydraulic cylinder 130. That is, the first controller 160 controls the first servomotor (SM1), and applies a pressure $P_0$ for supporting the load corresponding to the weight of the cushion pad 110, etc. from the first hydraulic pump (HP) to the lower chamber 120A of the first hydraulic cylinder 120.

Here, before the time to when the pre-pressurization is started, the first controller 160 sets the first solenoid valve 150 to ON to connect each of the lower chamber 120A and the upper chamber 120B of the first hydraulic cylinder 120 to the system pressure line 144 so that the pressures of the lower chamber 120A and the upper chamber 120B of the first hydraulic cylinder 120 are set to an equal pressure (first system pressure). When the cushion pad 110 is moved by the second hydraulic cylinder 130, the hydraulic oil having the first system pressure moves between the lower chamber 120A and the upper chamber 120B of the first hydraulic cylinder 120.

On the other hand, the second controller 180 shown in FIG. 8 performs the position control on the second hydraulic cylinder 130 based on the die cushion position command (first die cushion position command) for positioning the cushion pad 110 at the die cushion standby position $X_1$. In this case, the second controller 180 rotates the second servomotor (SM2) in one direction (first direction) or in the other direction (second direction) in order to hold the cushion pad 110 at the die cushion standby position $X_1$ according to the first die cushion position command, thereby adjusting the pressures to be applied to the lower chamber 130A and the upper chamber 130B of the second hydraulic cylinder 130 from the second hydraulic pump/motor (P/M2) driven by the second servomotor (SM2). In a state where the cushion pad 110 is held at the die cushion standby position $X_1$, a product of the cross-sectional area and the pressure of the lower chamber 130A of the second hydraulic cylinder 130 (that is, the cross-sectional area x pressure of the lower chamber 130A of the second hydraulic cylinder 130) is substantially the same as a product of the cross-sectional area and the pressure of the upper chamber 130B of the second hydraulic cylinder 130 (that is, the cross-sectional area x pressure of the upper chamber 130B of the second hydraulic cylinder 130).

After that, the slide 20 moves downward, and when the slide position reaches a position $X_0$ (time $t_0$ in FIG. 9) which is higher than the die cushion standby position $X_1$ by height H, the first controller 160 starts pre-pressurization for pressurizing the lower chamber 120A of the first hydraulic cylinder 120 to a set pressure $P_1$.

In this case, the first controller 160 drives the first hydraulic pump (HP) via the first servomotor (SM1) based on a second pressure command instructing pre-pressurization to a preset pressure $P_1$, etc. to supply pressure oil from the first hydraulic pump (HP) to the lower chamber 120A of the first hydraulic cylinder 120, thereby performing the pressure control so that the pressure of the lower chamber 120A of the first hydraulic cylinder 120 becomes to be the set pressure $P_1$.

By pressurizing the lower chamber 120A of the first hydraulic cylinder 120, the first hydraulic cylinder 120 applies to the cushion pad 110, a force for moving the cushion pad 110 upward.

When the cushion pad 110 is about to move upward due to the pre-pressurization control, the second controller 180 performs the position control on the second hydraulic cylinder 130 so that the cushion pad 110 is held at the die cushion standby position $X_1$ (so as not to move upward).

As a result, the cushion pad 110 is held at the die cushion standby position $X_1$, and the hydraulic oil in the lower chamber 120A of the first hydraulic cylinder 120 is pressurized (compressed) to have the set pressure $P_1$. In this state, there is no inflow of hydraulic oil from the first hydraulic pump (HP) into the lower chamber 120A of the first hydraulic cylinder 120. However, the first controller 160 continues to drive the first servomotor (SM1) to hold the pressure in the lower chamber 120A of the first hydraulic cylinder 120 at the set pressure $P_1$, and performs pressure control so that the pressure on the discharge side of the first hydraulic pump (HP) is equal to the set pressure $P_1$.

Further, the second controller 180 performs position control on the second hydraulic cylinder 130 so that the cushion pad 110 is held at the die cushion standby position. As a result, the second hydraulic cylinder 130 applies to the cushion pad 110, a force (downward pressing force) for offsetting the upward pressing force applied from the first hydraulic cylinder 120 to the cushion pad 110.

Here, the upward pressing force $F_1$ to be applied from the first hydraulic cylinder 120 to the cushion pad 110 can be expressed by the following equation.

$F_1$=the pressure (set pressure $P_1$) of the lower chamber 120A of the first hydraulic cylinder 120×the cross-sectional area of the lower chamber 120A [Equation 1]

The downward pressing force $F_2$ to be applied from the second hydraulic cylinder 130 to the cushion pad 110 can be expressed by the following equation.

$F_2$=the pressure of the upper chamber 130B of the second hydraulic cylinder 130×the cross-sectional area of the upper chamber 130B [Equation 2]

Therefore, when the cushion pad 110 is held at the die cushion standby position and the pre-pressurization is completed, $F_1=F_2$.

In the equation of [Equation 1], the first system pressure of the upper chamber 120B of the first hydraulic cylinder 120 is not taken into consideration, and in the equation of [Equation 2], the second system pressure of the lower chamber 130A of the second hydraulic cylinder 130 is not taken into consideration. However, when the first system pressure and the second system pressure are substantially the same and the cross-sectional area of the upper chamber 120B of the first hydraulic cylinder 120 and the cross-sectional area of the lower chamber 130A of the second hydraulic cylinder 130 are substantially the same, the forces generated by the first system pressure and the second system pressure substantially offset each other, so that the force $F_1$ pushing up the cushion pad 110 and the force $F_2$ depressing the cushion pad 110 are substantially equal to each other.

As shown in FIG. 9, the pre-pressurization is completed until the slide position reaches the die cushion standby position $X_1$ (time $t_1$), preferably.

The first controller 160 performs the pressure control on the first hydraulic cylinder 120 so as to hold the pressure of the lower chamber 120A of the first hydraulic cylinder 120 at the set pressure $P_1$ even after the slide position has reached the die cushion standby position $X_1$ (after impact). In this example, since the second pressure command for pre-pressurizing the lower chamber 120A of the first hydraulic cylinder 120 to the preset pressure $P_1$ before the press forming, indicates the same pressure as the first pressure command indicating the die cushion pressure $P_1$ corresponding to the die cushion force during the press forming, the first controller 160 performs the pressure control on the first hydraulic cylinder 120 based on the same pressure command during the period of time from the time to $t_0$ the time $t_1$ and the period of time from the time $t_1$ to the time (a time point at which the slide position reaches the bottom dead center) $t_2$.

Further, when the slide position reaches the die cushion standby position $X_1$ (time $t_1$), the second controller 180 performs the position control on the second hydraulic cylinder 130 based on the die cushion position command (third die cushion position command) corresponding to the slide position so as to prevent the die cushion force generated by the first hydraulic cylinder 120 from being hindered.

When the slide position has reaches the die cushion standby position $X_1$, the second controller 180 may switch the position control on the second hydraulic cylinder 130 to the pressure control based on the third pressure command. The third pressure command is a pressure command corresponding to the auxiliary die cushion force for assisting the die cushion force (main die cushion force) generated by the first hydraulic cylinder 120 during the press forming, or nullifying the die cushion force generated by the second hydraulic cylinder 130.

Next, when the slide position reaches the bottom dead center, for a certain period from the time $t_2$ when the slide 20 reaches the bottom dead center until the time $t_3$ when product knockout is started (that is, a locking period during which the cushion pad 110 is held at the position corresponding to the bottom dead center), the first controller 160 performs pressure control for depressurizing the lower chamber 120A of the first hydraulic cylinder 120 so that the pressure of the lower chamber 120A of the first hydraulic cylinder 120 is changed to the first system pressure $P_0$. After the locking (at the time $t_3$ or later), pressure control necessary for the product knockout is performed.

On the other hand, when the slide position reaches the bottom dead center, for a certain period (locking period) from the time $t_2$ when the slide 20 reaches the bottom dead center to the time $t_3$, the second controller 180 performs position control (locking control) for holding the cushion pad 110 at the position corresponding to the bottom dead center based on a fourth die cushion position command. Thereafter, the second controller 180 performs position control for moving the cushion pad 110 upward based on a fifth die cushion position command in order to move the cushion pad 110 to the die cushion standby position again.

According to the first control method of the die cushion device, the pressure in the lower chamber 120A of the first hydraulic cylinder 120 is pre-pressurized so as to be equal to the set pressure $P_1$ before the press forming, whereby the force applied to the cushion pad 110 from the second hydraulic cylinder 130 may be nullified immediately after impact. Therefore, the press forming may be started with the die cushion force (the set pressure $P_1$ corresponding to the die cushion force) necessary for press-forming from the moment of impact.

Further, because the pre-pressurizing is performed before the press forming, a surge pressure at the time of the impact may be reduced as compared with a case where the pre-pressurizing is not performed.

Further, because the cushion pad 110 is held at the die cushion standby position by the second hydraulic cylinder 130 before the press forming, there is an advantage that the cushion pad 110 is not pushed up even if the impact position is mistaken. In addition, there is also an advantage that, even if the switching from the position control for holding the cushion pad 110 at the die cushion standby position to the pressure control (or another position control) is roughly performed (after the impact), no problem occurs because the position control and the pressure control are separated from each other.

In addition, because the die cushion standby position may be freely set, a greater variety of dies may be supported by the cushion pins having the same length.

<Second Control Method of Die Cushion Device>

Next, a second control method of the die cushion device will be described.

Figure 10:
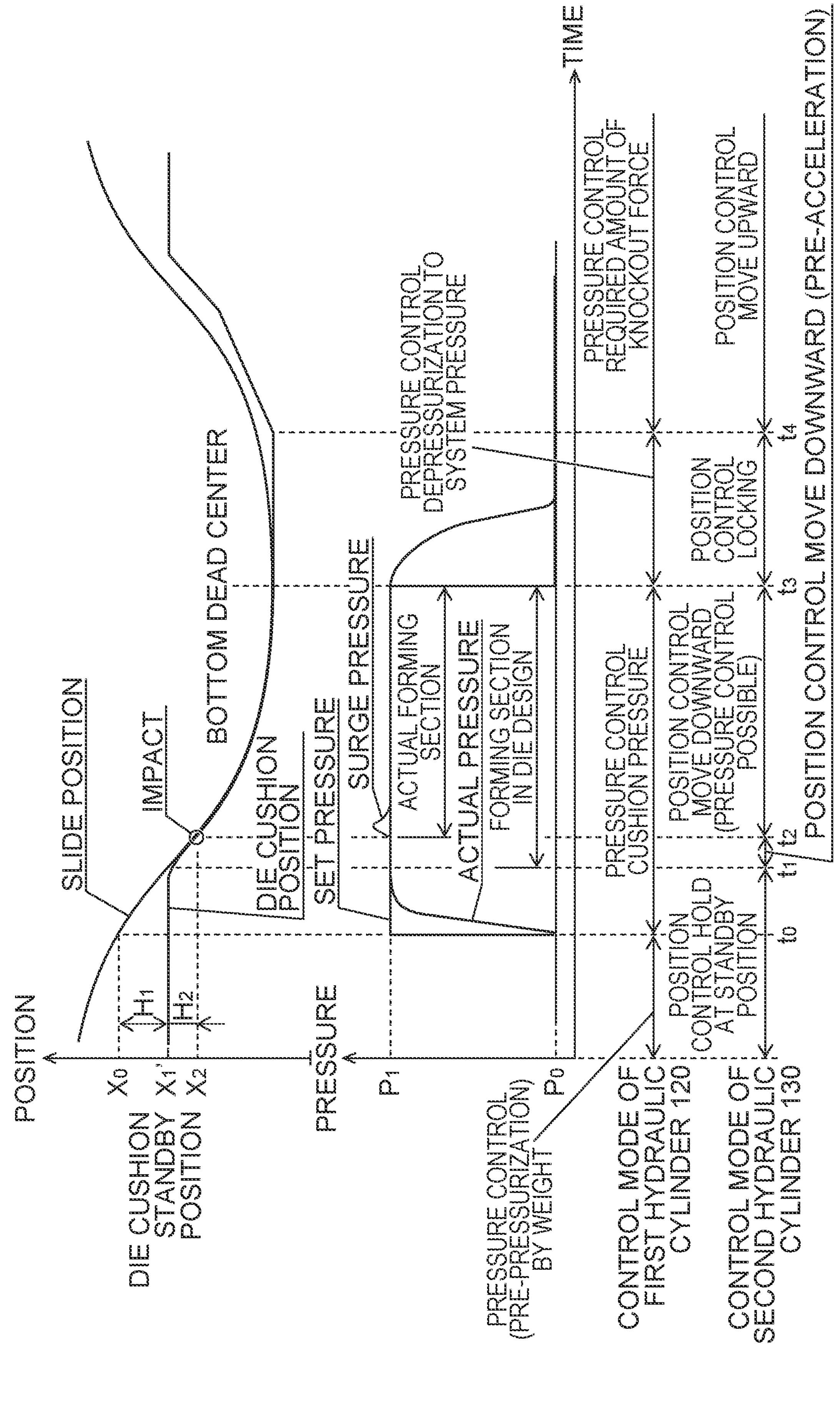
FIG. 10 is a waveform diagram showing a slide position, a die cushion position, a pressure command (set pressure), and an actual pressure in one press cycle in a case where the die cushion device is controlled by a second control method.

FIG. 10 is a waveform diagram showing a slide position, a die cushion position, a pressure command (set pressure), and an actual pressure in one press cycle when the die cushion device is controlled by the second control method.

The second control method of the die cushion device is different from the first control method of the die cushion device described with reference to FIG. 9 and the like in that control for pre-accelerating the cushion pad 110 before press forming is added. In the second control method of the die cushion device, detailed description of components common to the first control method is omitted.

As shown in FIG. 10, a die cushion standby position X' is a position which is higher than an impact position $X_2$ at the start of press forming by a height H2.

When the slide 20 moves downward to reach a position $X_0$ (time to in FIG. 10) which is higher than the die cushion standby position $X_1$' by a height $H_1$, as in the case of the first control method, the first controller 160 starts pre-pressurization for pressurizing the lower chamber 120A of the first hydraulic cylinder 120 to the set pressure $P_1$, and the second controller 180 performs position control on the second hydraulic cylinder 130 so as to hold the cushion pad 110 at the die cushion standby position $X_1$'.

Subsequently, before the slide position reaches the impact position (time $t_1$ in FIG. 10), the die cushion position commander 182 of the second controller 180 outputs the second die cushion position command for pre-accelerating the cushion pad 110, in place of the output of the first die cushion position command indicating the die cushion standby position $X_1$'.

The second controller 180 performs position control on the second hydraulic cylinder 130 based on the second die cushion position command so that the cushion pad 110 is accelerated (pre-accelerated) before the impact.

That is, the second controller 180 controls the second servomotor (SM2) to supply hydraulic oil from the second hydraulic pump/motor (P/M2) to the upper chamber 130B of the second hydraulic cylinder 130 and cause the second hydraulic cylinder 130 to move (pre-accelerate) the cushion pad 110 downward.

The first controller 160 continuously performs the pressure control during the pre-acceleration so that the pressure in the lower chamber 120A of the first hydraulic cylinder 120 is equal to the pressure $P_1$ set for the pre-pressurization.

Thereafter, when the slide position reaches the impact position $X_2$ (time $t_2$ in FIG. 10) at the start of the press forming, the second controller 180 performs position control on the second hydraulic cylinder 130 based on the die cushion position command (third die cushion position command) corresponding to the current slide position. Therefore, it possible to prevent the die cushion force generated by the first hydraulic cylinder 120 from being hindered. Here, the second controller 180 may switch the control of the second hydraulic cylinder 130 from the position control to the pressure control at the time of impact.

On the other hand, the first controller 160 continuously performs pressure control on the first hydraulic cylinder 120 as in the case of the pressure control during pre-acceleration.

The time $t_3$ in FIG. 10 is a time when the slide position reaches the bottom dead center, the time Li is a time when locking ends (locking end time). The first controller 160 and the second controller 180 switch to a different pressure command and a different position command at the time $t_3$ and the time $t_4$ to perform the pressure control and the position control as in the case of the first control method.

In the position control for pre-accelerating the cushion pad 110 by the second controller 180, it is preferable to reduce the difference between the speed of the slide 20 and the speed of the cushion pad 110 at the time of impact.

According to the second control method of the die cushion device, the pressure of the lower chamber 120A of the first hydraulic cylinder 120 is pre-pressurized so as to be equal to the set pressure $P_1$, and the cushion pad 110 is pre-accelerated. Therefore, press forming may be started with a die cushion force necessary for the press-forming from the moment of impact, and the surge pressure at the time of impact may be further reduced.

Further, the first hydraulic circuit 140-1 shown in FIG. 2 or the first hydraulic circuit 140-2 shown in FIG. 4 may be applied instead of the first hydraulic circuit 140-3 shown in FIG. 7. In this case, since the position of the cushion pad 110 may be controlled by the second hydraulic cylinder 130 or the like, the upper limit stopper 15 may be omitted. Further, since the first hydraulic circuit 140-1 cannot supply hydraulic oil to the lower chamber 120A of the first hydraulic cylinder 120, it cannot pre-pressurize the cushion pad 110 when the cushion pad 110 is positioned at the die cushion standby position. However, in a case where the cushion pad 110 is pre-accelerated, it is possible to pre-pressurize the cushion pad 110 in a period from the start of pre-acceleration to the impact.

[Second Mode of Hydraulic Circuit, etc. Applied to Die Cushion Device According to Second Embodiment]

Figure 11:
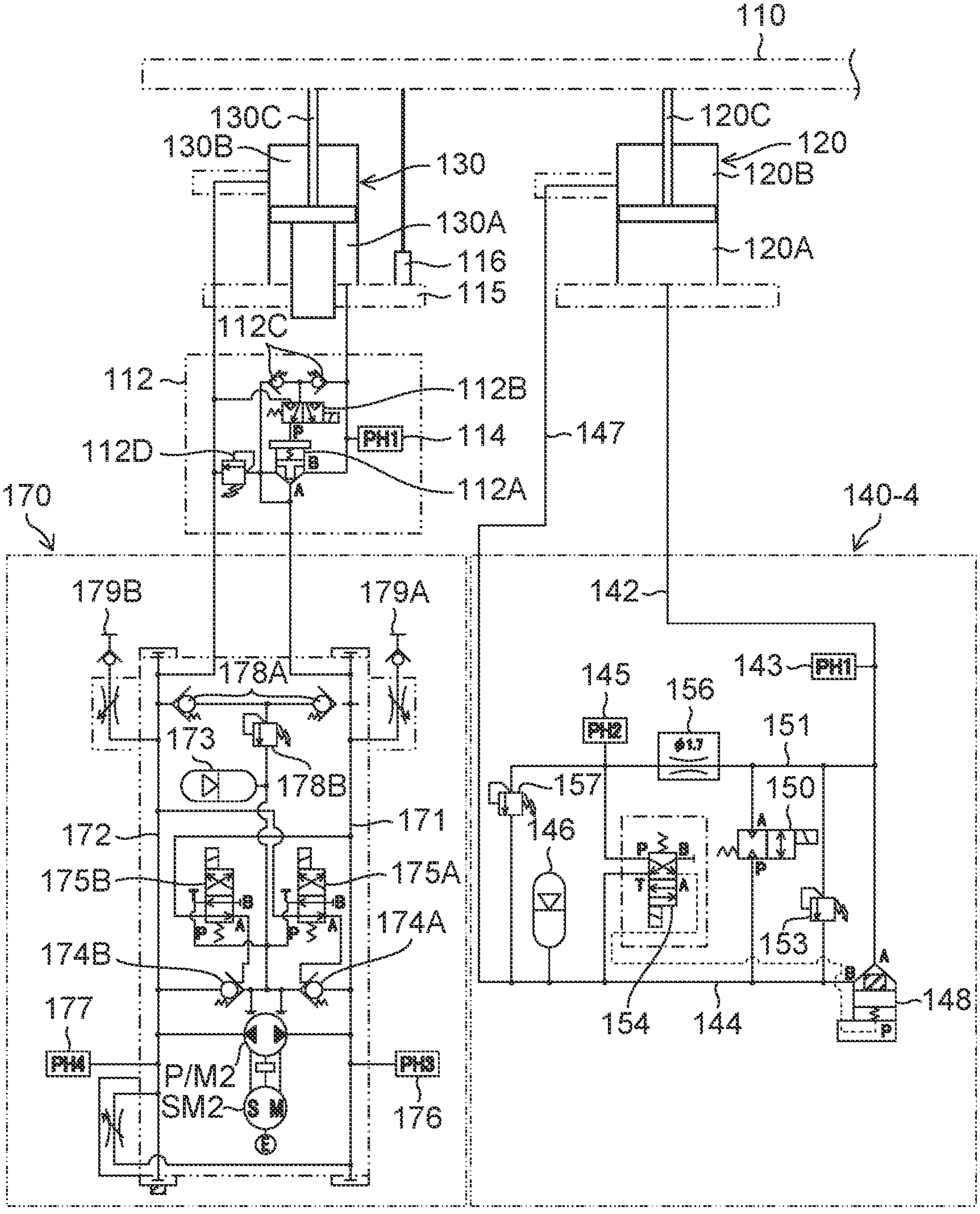
FIG. 11 is a diagram showing a second mode of the hydraulic circuit, etc. to be applied to the die cushion device according to the second embodiment.

FIG. 11 is a diagram showing a second mode of the hydraulic circuit, etc. applied to the die cushion device according to the second embodiment, and particularly shows the first hydraulic circuit 140-4 and the second hydraulic circuit 170. In FIG. 11, components common to the first embodiment of the hydraulic circuit, etc. shown in FIG. 7 are designated by the same reference numerals and characters, and detailed description thereof will be omitted.

The second mode of the hydraulic circuit, etc. shown in FIG. 11 is different from the first mode shown in FIG. 7 in that a first hydraulic circuit 140-4 is used instead of the first hydraulic circuit 140-3.

As compared with the first hydraulic circuit 140-3, the first hydraulic circuit 140-4 shown in FIG. 11 has a pilot relief valve 157, instead of the first servomotor (SM1) and the hydraulic pump (HP) serving as the pressure generator.

The pilot relief valve 157 is arranged between the orifice 156 functioning as a throttle provided in the first hydraulic line 151 and the system pressure line 144. The pilot relief valve 157 is provided in order to apply the pilot pressure to the pilot port P of the logic valve 148.

During press forming, the piston rod 120C of the first hydraulic cylinder 120 moves downward along with the downward movement of the cushion pad 110 to compress the hydraulic oil in the lower chamber 120A of the first hydraulic cylinder 120, whereby the pressure in the lower chamber 120A is increased.

Along with the flow of the hydraulic oil (a flow rate of hydraulic oil flowing per unit time) flowing from the lower chamber 120A of the first hydraulic cylinder 120 to the system pressure line 144 via the die cushion pressure generation line 142, the orifice 156 of the first hydraulic line 151 and the pilot relief valve 157 due to the pressure (die cushion pressure) of the lower chamber 120A of the first hydraulic cylinder 120, a pilot pressure lower than the die cushion pressure is generated between the orifice 156 and the pilot relief valve 157. The pilot pressure is applied to the pilot port P of the logic valve 148 via the second solenoid valve 154, whereby the opening degree of the logic valve 148 in the die cushion process is adjusted.

Note that the relief pressure of the pilot relief valve 157 is adjusted so that a desired die cushion pressure is generated in the lower chamber 120A of the first hydraulic cylinder 120.

The first hydraulic circuit 140-4 does not have any power source such as a hydraulic pump. The first hydraulic circuit 140-4 has the simplest configuration as compared with the first hydraulic circuit of the other embodiments and modes, and is inexpensive. Further, the first controller for controlling the first hydraulic circuit 140-4 may be any controller insofar as the first controller has a function of controlling the first solenoid valve 150 and the second solenoid valve 154.

On the other hand, in the second mode, the second hydraulic circuit 170 for driving the second hydraulic cylinder 130 has the same configuration as the second hydraulic circuit 170 shown in FIG. 7. Further, in the second mode, the second controller for controlling the second hydraulic circuit 170 may have the same configuration as the second controller 180 shown in FIG. 8.

As a result, the position of the cushion pad 110 may be controlled by using the second hydraulic cylinder 130, the second hydraulic circuit 170, and the like. The cushion pad 110 may be pre-accelerated by moving the second hydraulic cylinder 130 downward according to a press speed. Further, the cushion pad 110 is automatically pre-pressurized by the first hydraulic cylinder 120 during pre-acceleration.

Further, the control of the second hydraulic cylinder 130 may be switched from the position control to the pressure control, and the die cushion force is generated in the cushion pad 110 by performing pressure control on the second hydraulic cylinder 130 during the die cushion process.

That is, in the die cushion process, the die cushion force (main die cushion force) by the first hydraulic cylinder 120 and the die cushion force (auxiliary die cushion force) by the second hydraulic cylinder 130 may be generated in the cushion pad 110. As a result, the total die cushion force may be increased. Further, since the auxiliary die cushion force may be changed (variable), the total die cushion force may also be changed (variable). Further, in the die cushion process, up-and-down fluctuation of the pressure in the lower chamber 120A of the first hydraulic cylinder 120 caused by the hydraulic characteristics may be offset by the pressure control of the second hydraulic cylinder 130, whereby the total die cushion force may be made smooth.

Since the main die cushion force out of the total die cushion force may be covered by the first hydraulic cylinder 120, the auxiliary die cushion force may be reduced. Therefore, the number of each of the second servomotor (SM2) and the second hydraulic pump/motor (P/M2) in the second hydraulic circuit 170 for driving the second hydraulic cylinder 130 may be minimized (one in this example) so that the die cushion device may be made inexpensive as a whole.

[Third Mode of Hydraulic Circuit, Etc. Applied to Die Cushion Device According to Second Embodiment]

Figure 12:
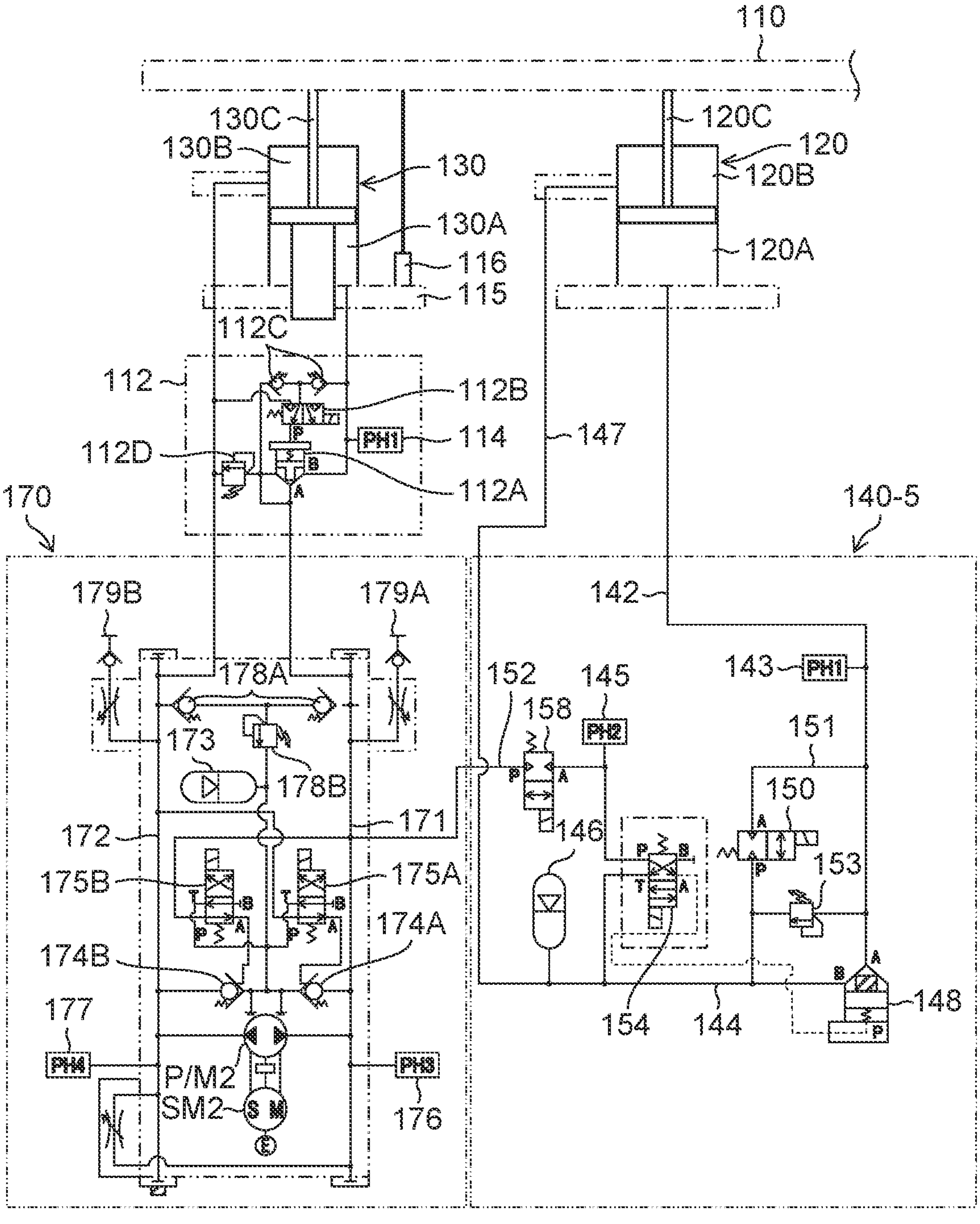
FIG. 12 is a diagram showing a third mode of the hydraulic circuit, etc. to be applied to the die cushion device according to the second embodiment.

FIG. 12 is a diagram showing a third mode of the hydraulic circuit, etc. applied to the die cushion device according to the second embodiment, and particularly shows a first hydraulic circuit 140-5 and the second hydraulic circuit 170. In FIG. 12, components common to the first embodiment of the hydraulic circuit, etc. shown in FIG. 7 are designated by the same reference numerals and characters, and detailed description thereof will be omitted.

The second mode of the hydraulic circuit, etc. shown in FIG. 12 is different from those of the first mode shown in FIG. 7 in that the first hydraulic circuit 140-5 is used instead of the first hydraulic circuit 140-3.

As compared with the first hydraulic circuit 140-1 shown in FIG. 2, the first hydraulic circuit 140-5 shown in FIG. 12 includes: a third hydraulic line (third hydraulic line) 152 which may connect the pilot port P of the logic valve 148 with the hydraulic line 171 of the second hydraulic circuit 170; and a third solenoid valve 158 configured to open/close the flow path of the third hydraulic line 152, instead of the first servomotor (SM1) and the hydraulic pump (HP) functioning as the pressure generator.

The third hydraulic line 152 and the third solenoid valve 158 function as a pilot pressure applying unit for causing the pressure of the hydraulic line 171 of the second hydraulic circuit 170 (that is, the pressure in the lower chamber 130A of the second hydraulic cylinder 130 to which the hydraulic line 171 is connected) to act as a pilot pressure for controlling the logic valve 148.

That is, when the third solenoid valve 158 is set to OFF (in a state shown in FIG. 12), the first hydraulic circuit 140-5 and the second hydraulic circuit 170 are separated from each other as the hydraulic circuits. When the third solenoid valve 158 is set to ON, the first hydraulic circuit 140-5 and the second hydraulic circuit 170 are connected to each other via the third hydraulic line 152, and the pressure of the hydraulic line 171 of the second hydraulic circuit 170 is allowed to be applied to the pilot port P of the logic valve 148 via the third hydraulic line 152 having the third solenoid valve 158 and the second solenoid valve 154.

Next, the operation of the first hydraulic circuit 140-5 will be described.

When position control is performed on the cushion pad 110 by the second hydraulic cylinder 130 before press forming, the first solenoid valve 150 is set to ON, and each of the lower chamber 120A and the upper chamber 120B of the first hydraulic cylinder 120 is connected to the system pressure line 144 so that the pressures in the lower chamber 120A and upper chamber 120B of the first hydraulic cylinder 120 are equal to the first system pressure. As a result, when the cushion pad 110 is moved by the second hydraulic cylinder 130, the hydraulic oil having the first system pressure moves (flows into/out) in the lower chamber 120A and the upper chamber 120B of the first hydraulic cylinder 120.

In the die cushion process during the press forming, the control of the second hydraulic cylinder 130 is switched from the position control to the pressure control, the first solenoid valve 150 and the second solenoid valve 154 are set to OFF, and the third solenoid valve 158 is set to ON. Thus, the pressure in the lower chamber 130A of the second hydraulic cylinder 130 for which pressure control (the pressure in the hydraulic line 171) is performed, is applied as a pilot pressure to the pilot port P of the logic valve 148 via the third hydraulic line 152, the third solenoid valve 158, and the second solenoid valve 154.

The opening degree of the logic valve 148 is adjusted according to the pilot pressure, and the pressure in the lower chamber 120A of the first hydraulic cylinder 120 becomes a die cushion pressure which is a pressure slightly higher than the pilot pressure (the pilot pressure+$\alpha$).

The total die cushion force applied to the cushion pad 110 by the first hydraulic cylinder 120 and the second hydraulic cylinder 130 is equal to a total of the main die cushion force and the auxiliary die cushion force. The main die cushion force is based on the product of the cross-sectional area of the lower chamber 120A of the first hydraulic cylinder 120 and (the pilot pressure (=the pressure of the lower chamber 130A of the second hydraulic cylinder 130)+$\alpha$)), and the auxiliary die cushion force is based on the cross-sectional area of the lower chamber 130A of the second hydraulic cylinder 130 and the pressure in the lower chamber 130A of the second hydraulic cylinder 130. Therefore, by controlling the pressure in the lower chamber 130A of the second hydraulic cylinder 130, the total die cushion force generated by the cushion pad 110 can be set to be equal to the set die cushion force.

Further, the following method may pre-pressurize the cushion pad 110 while the cushion pad 110 is held at the die cushion standby position.

For example, when the control of the second hydraulic cylinder 130 is switched to the pressure control and the pressure in the lower chamber 130A of the second hydraulic cylinder 130 becomes a pressure corresponding to the pilot pressure, the third solenoid valve 158 is set to OFF, thereby enclosing the pilot pressure applied to the pilot port P of the logic valve 148 from the hydraulic line 171 via the third hydraulic line 152, the third solenoid valve 158, and the second solenoid valve 154.

Next, when the position control is performed on the second hydraulic cylinder 130, the position control is performed so that the cushion pad 110 is moved up to a position which is slightly higher than the die cushion standby position, and then position control is performed so as to move the cushion pad 110 down to the die cushion standby position.

After the cushion pad 110 is moved to the position which is slightly higher than the die cushion standby position, the first solenoid valve 150 is set to OFF so that the hydraulic oil having the first system pressure is not moved between the lower chamber 120A and the upper chamber 120B of the first hydraulic cylinder 120.

Thereafter, when the cushion pad 110 is moved (moved downward) to the die cushion standby position by the second hydraulic cylinder 130, the hydraulic oil in the lower chamber 120A of the first hydraulic cylinder 120 is compressed along with the downward movement of the cushion pad 110. The hydraulic oil in the lower chamber 120A of the first hydraulic cylinder 120 is compressed so as to have a pressure corresponding to the sealed pilot pressure which is applied to the pilot port P of the logic valve 148. As a result, the lower chamber 120A of the first hydraulic cylinder 120 is pre-pressurized to the pressure corresponding to the sealed pilot pressure.

Here, the third solenoid valve 158 is set to ON during the die cushioning process so as to set the pressure in the lower chamber 130A of the second hydraulic cylinder 130 to the pilot pressure. However, the third solenoid valve 158 may be continuously set to OFF even during the die cushion process so as to continue the sealing of the pilot pressure insofar as the pressure of the sealed pilot pressure is not reduced.

Like the first hydraulic circuit 140-4, the first hydraulic circuit 140-5 does not have any power source such as a hydraulic pump, has a simple configuration, and is inexpensive.

Others

In the embodiments, die cushion devices has only one first hydraulic cylinder 120 on which pressure control is performed with respect to the cushion pad 110. However, the number of the first hydraulic cylinders 120 is not limited to one. Further, the number of the second hydraulic cylinders 130 which are controlled independently of the first hydraulic cylinder(s) 120 is not limited to the examples in the embodiments.

Further, in the second hydraulic circuit 170 for driving the second hydraulic cylinder 130, one servo motor and one hydraulic pump/motor is arranged for one second hydraulic cylinder 130. However, the present invention is not limited to this configuration. Any number of the servo motors and any number of hydraulic pumps/motors may be provided.

Further, the second hydraulic circuit for driving the second hydraulic cylinder and the second controller for controlling the second hydraulic circuit are not limited to those of the present embodiment, and any device may be used insofar as it can perform position control on at least the second hydraulic cylinder.

Further, hydraulic oil is used as the hydraulic fluid for the first and second hydraulic cylinders and the first and second hydraulic circuits in the embodiments. However, hydraulic fluid is not limited to oil, and water or other fluid may be used.

Still further, it goes without saying that the present invention is not limited to the above-described embodiments, and various modifications may be made without departing from the spirit of the present invention.

REFERENCE SIGNS LIST

10 press machine
11 cushion pad
12 column
14 bed
15 upper limit stopper
18 guide part
20 slides
22 crankshaft
24 connecting rod
26 slide position detector
28 crankshaft encoder
30 upper die
32 bolster
34 lower die
100-1, 100-2 die cushion device
102 blank holder
104 cushion pin
110 cushion pad
112 hydraulic circuit
112A logic valve
112B solenoid valve
112C check valve
112D relief valve
114 second pressure detector
115 fixing part
116 die cushion position detector
120 first hydraulic cylinder
120A lower chamber
120B upper chamber
120C piston rod
121 silencer
130 second hydraulic cylinder
130A lower chamber
130B upper chamber
130C piston rod
140, 140-1 to 140-5 first hydraulic circuit
142 die cushion pressure generation line
143 first pressure detector
144 system pressure line
145 pressure detector
146 first accumulator
147 second hydraulic line
148 logic valve
150 first solenoid valve
151 first hydraulic line
152 third hydraulic line
153 relief valve
154 second solenoid valve
156 orifice
157 pilot relief valve
158 third solenoid valve
160 first controller
160-1 first controller
160-2 first controller
162-1 first pressure commander
162-2 first pressure commander
164, 166 amplifier
165 amplifier/PWM controller
167 DC power supply with power regeneration function
169 AC power supply
170 second hydraulic circuit
171, 172 hydraulic lines
173 second accumulator
174A first pilot check valve
174B second pilot check valve
175A, 175B solenoid valve
176, 177 pressure detector
178A check valve
178B relief valve
179A, 179B coupler
180 second controller
180A die cushion position control unit
180B die cushion pressure control unit
181 die cushion position controller
182 die cushion position commander
183 die cushion pressure controller
184 second pressure commander
185 amplifier/PWM controller
186 DC power supply with power regeneration function
187 AC power supply
188, 189 amplifier
SM1 first servomotor
SM2 second servomotor
P/M1 first hydraulic pump/motor
P/M2 second hydraulic pump/motor

What is claimed is:

1. A die cushion device comprising:

a first hydraulic cylinder configured to support a cushion pad and cause the cushion pad to generate a die cushion force in a case where a slide of a press machine is moved downward;

a first hydraulic circuit configured to drive the first hydraulic cylinder;

a first pressure commander configured to output a first pressure command indicating a die cushion pressure corresponding to the die cushion force;

a first pressure detector configured to detect a pressure in a lower chamber of the first hydraulic cylinder; and a first controller configured to control the first hydraulic circuit based on the first pressure command and the pressure detected by the first pressure detector in such a manner that a pressure applied to the lower chamber of the first hydraulic cylinder is equal to a pressure corresponding to the first pressure command, wherein the first hydraulic circuit is a hydraulic closed circuit including a die cushion pressure generation line connected to the lower chamber of the first hydraulic cylinder, a system pressure line to which a first accumulator configured to accumulate hydraulic fluid having a first system pressure is connected, a pilot-operated logic valve which has an A port connected to the die cushion pressure generation line and a B port connected to the system pressure line, and a pressure generator configured to generate a pilot pressure to act on a pilot port of the logic valve, wherein the first controller controls the pilot pressure based on the first pressure command and the pressure detected by the first pressure detector, and controls a pressure of hydraulic fluid flowing from the A port of the logic valve to the B port of the logic valve in such a manner that a pressure of hydraulic fluid in the lower chamber of the first hydraulic cylinder which is a pressure on the A port side is equal to the pressure corresponding to the first pressure command, wherein the first hydraulic circuit includes a first hydraulic line configured to connect the pressure generator and the die cushion pressure generation line, and a second hydraulic line configured to connect an upper chamber of the first hydraulic cylinder and the system pressure line, the first pressure commander outputs a second pressure command for pre-pressurizing the lower chamber of the first hydraulic cylinder to have a preset pressure before press forming, and the first controller controls the pressure generator based on the second pressure command and the pressure detected by the first pressure detector to pre-pressurize the lower chamber of the first hydraulic cylinder to have a pressure corresponding to the second pressure command before press forming.

2. The die cushion device according to claim 1, wherein the first hydraulic circuit includes a first solenoid valve configured to open and close a flow path between the die cushion pressure generation line and the system pressure line, and after press forming, or after locking for a certain period of time after press forming, the first controller causes the first solenoid valve to open in such a manner that hydraulic fluid having the first system pressure accumulated in the first accumulator may be supplied to the lower chamber of the first hydraulic cylinder.

3. The die cushion device according to claim 1, further comprising a throttle arranged in the first hydraulic line or between the pressure generator and the pilot port of the logic valve.

4. The die cushion device according to claim 1, wherein the first hydraulic circuit includes a second solenoid valve configured to cause the first system pressure or the pilot pressure to selectively act on the pilot port of the logic valve.

5. The die cushion device according to claim 1, wherein the pressure generator comprises a first hydraulic pump/motor arranged between the system pressure line and the first hydraulic line, and a first servomotor connected to a rotating shaft of the first hydraulic pump/motor, the first pressure commander outputs the second pressure command before press forming, and before press forming, the first controller controls the first servomotor based on the second pressure command and the pressure detected by the first pressure detector, and causes the first hydraulic pump/motor to operate as a hydraulic pump to supply hydraulic fluid to the lower chamber of the first hydraulic cylinder and pre-pressurize the lower chamber of the first hydraulic cylinder to have a pressure corresponding to the second pressure command, and during press forming, the first controller controls the first servomotor based on the first pressure command and the pressure detected by the first pressure detector, and causes the first hydraulic pump/motor to operate as a hydraulic motor in such a manner that a part of hydraulic fluid pushed away from the lower chamber of the first hydraulic cylinder flows into the system pressure line via the first hydraulic pump/motor while rest of the hydraulic fluid pushed out from the lower chamber of the first hydraulic cylinder flows into the system pressure line via the logic valve, thereby controlling the pressure in the lower chamber of the first hydraulic cylinder, to be equal to the pressure corresponding to the first pressure command.

6. A die cushion device comprising:

a first hydraulic cylinder configured to support a cushion pad and cause the cushion pad to generate a die cushion force in a case where a slide of a press machine is moved downward;

a first hydraulic circuit configured to drive the first hydraulic cylinder;

a first pressure commander configured to output a first pressure command indicating a die cushion pressure corresponding to the die cushion force;

a first pressure detector configured to detect a pressure in a lower chamber of the first hydraulic cylinder; and a first controller configured to control the first hydraulic circuit based on the first pressure command and the pressure detected by the first pressure detector in such a manner that a pressure applied to the lower chamber of the first hydraulic cylinder is equal to a pressure corresponding to the first pressure command, wherein the first hydraulic circuit is a hydraulic closed circuit including a die cushion pressure generation line connected to the lower chamber of the first hydraulic cylinder, a system pressure line to which a first accumulator configured to accumulate hydraulic fluid having a first system pressure is connected, a pilot-operated logic valve which has an A port connected to the die cushion pressure generation line and a B port connected to the system pressure line, and a pressure generator configured to generate a pilot pressure to act on a pilot port of the logic valve, wherein the first controller controls the pilot pressure based on the first pressure command and the pressure detected by the first pressure detector, and controls a pressure of hydraulic fluid flowing from the A port of the logic valve to the B port of the logic valve in such a manner that a pressure of hydraulic fluid in the lower chamber of the first hydraulic cylinder which is a pressure on the A port side is equal to the pressure corresponding to the first pressure command, wherein the pressure generator comprises a hydraulic pump arranged between the system pressure line and the pilot port of the logic valve, and a first servomotor connected to a rotating shaft of the hydraulic pump, and during press forming, the first controller controls a torque of the first servomotor based on the first pressure command and the pressure detected by the first pressure detector to control the pilot pressure.

7. A die cushion device comprising:

a first hydraulic cylinder configured to support a cushion pad and cause the cushion pad to generate a die cushion force in a case where a slide of a press machine is moved downward;

a first hydraulic circuit configured to drive the first hydraulic cylinder;

a first pressure commander configured to output a first pressure command indicating a die cushion pressure corresponding to the die cushion force;

a first pressure detector configured to detect a pressure in a lower chamber of the first hydraulic cylinder; and a first controller configured to control the first hydraulic circuit based on the first pressure command and the pressure detected by the first pressure detector in such a manner that a pressure applied to the lower chamber of the first hydraulic cylinder is equal to a pressure corresponding to the first pressure command, wherein the first hydraulic circuit is a hydraulic closed circuit including a die cushion pressure generation line connected to the lower chamber of the first hydraulic cylinder, a system pressure line to which a first accumulator configured to accumulate hydraulic fluid having a first system pressure is connected, a pilot-operated logic valve which has an A port connected to the die cushion pressure generation line and a B port connected to the system pressure line, and a pressure generator configured to generate a pilot pressure to act on a pilot port of the logic valve, wherein the first controller controls the pilot pressure based on the first pressure command and the pressure detected by the first pressure detector, and controls a pressure of hydraulic fluid flowing from the A port of the logic valve to the B port of the logic valve in such a manner that a pressure of hydraulic fluid in the lower chamber of the first hydraulic cylinder which is a pressure on the A port side is equal to the pressure corresponding to the first pressure command, wherein the die cushion device further comprising:

a second hydraulic cylinder configured to support and move the cushion pad in an up and down direction;

a second hydraulic circuit configured to drive the second hydraulic cylinder;

a die cushion position commander configured to output a die cushion position command indicating a position of the cushion pad;

a die cushion position detector configured to detect the position of the cushion pad; and a second controller configured to control the second hydraulic circuit based on the die cushion position command output from the die cushion position commander and the position of the cushion pad detected by the die cushion position detector in such a manner that the position of the cushion pad matches a position corresponding to the die cushion position command.

8. The die cushion device according to claim 7, wherein the die cushion position commander outputs a first die cushion position command for causing the cushion pad to stand by at a die cushion standby position before press forming, and the second controller controls the second hydraulic circuit based on the first die cushion position command to cause the cushion pad to stand by at the die cushion standby position before press forming.

9. The die cushion device according to claim 8, wherein the die cushion standby position is a position above an impact position at which press forming is started, the die cushion position commander outputs a second die cushion position command for pre-accelerating the cushion pad for a period of time until the cushion pad reaches the impact position from the die cushion standby position after outputting the first die cushion position command, and the second controller controls the second hydraulic circuit based on the second die cushion position command to pre-accelerate the cushion pad for a period of time until the cushion pad reaches the impact position from the die cushion standby position.

10. The die cushion device according to claim 7, further comprising:

a second pressure commander configured to output a third pressure command indicating a preset third pressure; and a second pressure detector configured to detect a pressure in a lower chamber of the second hydraulic cylinder, wherein the second controller controls the second hydraulic circuit based on the third pressure command and the pressure detected by the second pressure detector during press forming in such a manner that the pressure in the lower chamber of the second hydraulic cylinder becomes equal to the third pressure corresponding to the third pressure command.

11. The die cushion device according to claim 10, wherein the third pressure command is a pressure command corresponding to an auxiliary die cushion force for assisting a main die cushion force generated by the first hydraulic cylinder or a pressure command for nullifying a die cushion force generated by the second hydraulic cylinder.

12. The die cushion device according to claim 7, wherein the die cushion position commander outputs a third die cushion position command corresponding to a position of the slide during press forming, and the second controller controls the second hydraulic circuit based on the third die cushion position command during press forming to move the cushion pad to a position corresponding to the position of the slide.

13. The die cushion device according to claim 7, wherein in a case where the slide reaches a bottom dead center, the die cushion position commander outputs a fourth die cushion position command for holding the cushion pad at a position corresponding to the bottom dead center for a certain period of time, and then outputs a fifth die cushion position command for moving the cushion pad to a die cushion standby position, and in a case where the slide reaches the bottom dead center, the second controller controls the second hydraulic circuit based on the fourth die cushion position command and the fifth die cushion position command to hold the cushion pad at the position corresponding to the bottom dead center for a certain period of time, and then move the cushion pad to the die cushion standby position.

14. The die cushion device according to claim 7, wherein the second hydraulic circuit includes: a second hydraulic pump/motor connected between an upper chamber and a lower chamber of the second hydraulic cylinder; a second servomotor connected to a rotating shaft of the second hydraulic pump/motor; a second accumulator configured to accumulate hydraulic fluid having a second system pressure; a first pilot check valve provided in a flow path between the upper chamber of the second hydraulic cylinder and the second accumulator; and a second pilot check valve provided in a flow path between the lower chamber of the second hydraulic cylinder and the second accumulator, and in a case where hydraulic fluid is supplied from the second hydraulic pump/motor to the upper chamber of the second hydraulic cylinder, the second controller causes the second servomotor to rotate in a first direction to supply the hydraulic fluid from the second hydraulic pump/motor to the upper chamber of the second hydraulic cylinder, and causes the second accumulator to accumulate hydraulic fluid pushed away from the lower chamber of the second hydraulic cylinder via the second pilot check valve, and in a case where the hydraulic fluid is supplied from the second hydraulic pump/motor to the lower chamber of the second hydraulic cylinder, the second controller causes the second servomotor to rotate in a second direction to supply the hydraulic fluid from the second hydraulic pump/motor to the lower chamber of the second hydraulic cylinder, and causes the second accumulator to accumulate hydraulic fluid pushed away from the upper chamber of the second hydraulic cylinder via the first pilot check valve.

15. A die cushion device comprising:

a first hydraulic cylinder configured to support a cushion pad and cause the cushion pad to generate a die cushion force in a case where a slide of a press machine is moved downward;

a first hydraulic circuit configured to drive the first hydraulic cylinder;

a second hydraulic cylinder configured to support the cushion pad and move the cushion pad in an up and down direction;

a second hydraulic circuit configured to drive the second hydraulic cylinder;

a die cushion position commander configured to output a die cushion position command indicating a position of the cushion pad;

a die cushion position detector configured to detect a position of the cushion pad; and a second controller configured to control the second hydraulic circuit based on the die cushion position command output from the die cushion position commander and the position of the cushion pad detected by the die cushion position detector in such a manner that the position of the cushion pad matches a position corresponding to the die cushion position command, wherein the first hydraulic circuit is a hydraulic closed circuit including a die cushion pressure generation line connected to a lower chamber of the first hydraulic cylinder, a system pressure line to which a first accumulator for accumulating hydraulic fluid having a first system pressure is connected, a pilot-operated logic valve which has an A port connected to the die cushion pressure generation line and a B port connected to the system pressure line, and a pilot pressure applying unit configured to apply a pilot pressure to act on a pilot port of the logic valve.

16. The die cushion device according to claim 15, wherein the pilot pressure applying unit is a pilot relief valve arranged between the die cushion pressure generation line and the system pressure line.

17. The die cushion device according to claim 15, wherein the pilot pressure applying unit is a third hydraulic line configured to connect the pilot port of the logic valve and a lower chamber of the second hydraulic cylinder.

18. The die cushion device according to claim 17, further comprising a third solenoid valve configured to open and close a flow path of the third hydraulic line.

19. The die cushion device according to claim 15, wherein the die cushion position commander outputs a first die cushion position command for causing the cushion pad to stand by at a die cushion standby position before press forming, and the second controller controls the second hydraulic circuit based on the first die cushion position command to cause the cushion pad to stand by at the die cushion standby position before press forming.

20. The die cushion device according to claim 19, wherein the die cushion standby position is a position above an impact position at which press forming is started, the die cushion position commander outputs a second die cushion position command for pre-accelerating the cushion pad for a period of time until the cushion pad reaches the impact position from the die cushion standby position after outputting the first die cushion position command, and the second controller controls the second hydraulic circuit based on the second die cushion position command to pre-accelerate the cushion pad for a period of time until the cushion pad reaches the impact position from the die cushion standby position.

21. The die cushion device according to claim 15, further comprising:

a second pressure commander configured to output a third pressure command indicating a preset third pressure; and a second pressure detector configured to detect a pressure in a lower chamber of the second hydraulic cylinder, wherein the second controller controls the second hydraulic circuit based on the third pressure command and the pressure detected by the second pressure detector during press forming in such a manner that the pressure in the lower chamber of the second hydraulic cylinder becomes equal to the third pressure corresponding to the third pressure command.

22. The die cushion device according to claim 21, wherein the third pressure command is a pressure command corresponding to an auxiliary die cushion force for assisting a main die cushion force generated by the first hydraulic cylinder or a pressure command for nullifying a die cushion force generated by the second hydraulic cylinder.

23. The die cushion device according to claim 15, wherein the die cushion position commander outputs a third die cushion position command corresponding to a position of the slide during press forming, and the second controller controls the second hydraulic circuit based on the third die cushion position command during press forming to move the cushion pad to a position corresponding to the position of the slide.

24. The die cushion device according to claim 15, wherein in a case where the slide reaches a bottom dead center, the die cushion position commander outputs a fourth die cushion position command for holding the cushion pad at a position corresponding to the bottom dead center for a certain period of time, and then outputs a fifth die cushion position command for moving the cushion pad to a die cushion standby position, and in a case where the slide reaches the bottom dead center, the second controller controls the second hydraulic circuit based on the fourth die cushion position command and the fifth die cushion position command to hold the cushion pad at the position corresponding to the bottom dead center for a certain period of time, and then move the cushion pad to the die cushion standby position.

25. The die cushion device according to claim 15, wherein the second hydraulic circuit includes: a second hydraulic pump/motor connected between an upper chamber and a lower chamber of the second hydraulic cylinder; a second servomotor connected to a rotating shaft of the second hydraulic pump/motor; a second accumulator configured to accumulate hydraulic fluid having a second system pressure; a first pilot check valve provided in a flow path between the upper chamber of the second hydraulic cylinder and the second accumulator; and a second pilot check valve provided in a flow path between the lower chamber of the second hydraulic cylinder and the second accumulator, and in a case where hydraulic fluid is supplied from the second hydraulic pump/motor to the upper chamber of the second hydraulic cylinder, the second controller causes the second servomotor to rotate in a first direction to supply the hydraulic fluid from the second hydraulic pump/motor to the upper chamber of the second hydraulic cylinder, and causes the second accumulator to accumulate hydraulic fluid pushed away from the lower chamber of the second hydraulic cylinder via the second pilot check valve, and in a case where the hydraulic fluid is supplied from the second hydraulic pump/motor to the lower chamber of the second hydraulic cylinder, the second controller causes the second servomotor to rotate in a second direction to supply the hydraulic fluid from the second hydraulic pump/motor to the lower chamber of the second hydraulic cylinder, and causes the second accumulator to accumulate hydraulic fluid pushed away from the upper chamber of the second hydraulic cylinder via the first pilot check valve.

26. The die cushion device according to claim 15, wherein the hydraulic closed circuit does not have a hydraulic pump for pressurizing the hydraulic fluid in which the hydraulic fluid having the first system pressure is pressurized and sealed.

27. The die cushion device according to claim 26, wherein an opening degree of the logic valve is adjusted according to the pilot pressure, and the pressure in the lower chamber of the first hydraulic cylinder is controlled to become a die cushion pressure corresponding to the pilot pressure.

* * * * *